(12) United States Patent  (10) Patent No.: US 11,855,703 B2
Shukunami et al.  (45) Date of Patent: Dec. 26, 2023

(54) OPTICAL COHERENT TRANSCEIVER AND FILTER ADJUSTMENT METHOD

(71) Applicant: FUJITSU LIMITED, Kawasaki (JP)

(72) Inventors: Norifumi Shukunami, Yokohama (JP); Shoichi Murakami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/725,953

(22) Filed: Apr. 21, 2022

(65) Prior Publication Data

US 2023/0045731 A1 Feb. 9, 2023

(30) Foreign Application Priority Data

Aug. 5, 2021 (JP) .................................. 2021-129079

(51) Int. Cl.
*H04B 10/40* (2013.01)
*H04B 10/64* (2013.01)
*H04B 10/61* (2013.01)

(52) U.S. Cl.
CPC .......... *H04B 10/614* (2013.01); *H04B 10/40* (2013.01); *H04B 10/615* (2013.01); *H04B 10/6165* (2013.01); *H04B 10/64* (2013.01)

(58) Field of Classification Search
None
See application file for complete search history.

(56) References Cited

U.S. PATENT DOCUMENTS

| | | | |
|---|---|---|---|
| 2003/0072060 A1* | 4/2003 | Sourani | H04B 10/64 398/121 |
| 2005/0111498 A1* | 5/2005 | Daiber | H01S 5/0612 372/20 |
| 2007/0065151 A1* | 3/2007 | Dybsetter | H04B 10/40 398/135 |
| 2010/0123949 A1 | 5/2010 | Naito et al. | |
| 2012/0076506 A1 | 3/2012 | Goebuchi et al. | |
| 2016/0164624 A1 | 6/2016 | Yamauchi | |
| 2016/0248513 A1* | 8/2016 | Saito | H04J 14/021 |
| 2017/0142504 A1* | 5/2017 | Hochberg | H04B 10/6151 |
| 2017/0257182 A1 | 9/2017 | Yamauchi | |

(Continued)

FOREIGN PATENT DOCUMENTS

| | | |
|---|---|---|
| JP | 63-231428 | 9/1988 |
| JP | 2008-252545 | 10/2008 |

(Continued)

*Primary Examiner* — Darren E Wolf
(74) *Attorney, Agent, or Firm* — STAAS & HALSEY LLP

(57) ABSTRACT

A coherent transceiver includes a modulator, a receiver, a filter, a splitter, a detector, and a controller. The modulator modulates a data on the basis of laser light and outputs transmission light. The receiver receives reception light with same wavelength as the transmission light from input multiplexed light, on the basis of the laser light. The filter is arranged on an input stage of the receiver and includes a first port that inputs the multiplexed light, a filter body that transmits the reception light from the multiplexed light, and a second port that outputs the transmitted reception light. The splitter splits the transmission light travelling from the modulator and inputs the splitted transmission light. The detector detects a level of the splitted transmission light input. The controller adjusts a passband of the filter on the basis of the detected level.

8 Claims, 19 Drawing Sheets

(56) References Cited

U.S. PATENT DOCUMENTS

| | | | | |
|---|---|---|---|---|
| 2017/0288779 | A1* | 10/2017 | Tatum | H04B 10/25073 |
| 2018/0175963 | A1* | 6/2018 | Soto | H04B 10/40 |
| 2019/0243164 | A1* | 8/2019 | Nelson | H03K 17/687 |
| 2019/0253173 | A1 | 8/2019 | Yamauchi | |
| 2020/0153534 | A1 | 5/2020 | Yamauchi | |
| 2021/0021366 | A1 | 1/2021 | Yamauchi | |
| 2021/0409122 | A1* | 12/2021 | Zhou | G01S 7/4911 |

FOREIGN PATENT DOCUMENTS

| | | |
|---|---|---|
| JP | 2010-123698 | 6/2010 |
| JP | 2012-70234 | 4/2012 |
| JP | 2016-154297 | 8/2016 |
| WO | WO2015/004828 | 1/2015 |

* cited by examiner

OPTICAL COHERENT TRANSCEIVER AND FILTER ADJUSTMENT METHOD

CROSS-REFERENCE TO RELATED APPLICATION

This application is based upon and claims the benefit of priority of the prior Japanese Patent Application No. 2021-129079, filed on Aug. 5, 2021, the entire contents of which are incorporated herein by reference.

FIELD

The embodiments discussed herein are related to an optical coherent transceiver and a filter adjustment method.

BACKGROUND

In recent years, a bit rate per wavelength in an optical coherent transceiver is increasing year by year. Currently, a bit rate of 200 gigabit per second (Gbps) or 400 Gbps is adopted for practical use in the optical coherent transceiver, for example. However, a technology is being developed to further improve speed to achieve 1.2 terabit per second (Tbps) or 1.6 Tbps in the future.

FIG. 13 is an explanatory diagram illustrating an example of a conventional optical coherent transceiver 200. The optical coherent transceiver 200 illustrated in FIG. 13 includes a wavelength variable laser 202, a beam splitter (BS) 203, an optical transmission device 204, an optical reception device 205, a digital signal processor (DSP) 206, and a control circuit 208. The wavelength variable laser 202 emits laser light. The BS 203 optically splits the laser light travelling from the wavelength variable laser 202 toward the optical transmission device 204 and the optical reception device 205. The DSP 206 performs signal processing on a data signal that is an electric signal, transmits the data signal subjected to the signal processing to the optical transmission device 204, receives a data signal from the optical reception device 205, and performs signal processing on the received data signal. Meanwhile, the signal processing is certain signal processing, such as waveform distortion compensation or a wavelength dispersion process, for example. The optical transmission device 204 is connected to an optical fiber 207 and transmits transmission light to the optical fiber 207. The optical reception device 205 is connected to the optical fiber 207 and receives multiplexed (wavelength division multiplexing: WDM) light from the optical fiber 207. Meanwhile, the number of wavelengths of the multiplexed light is, for example, 1 to 16. The control circuit 208 controls the entire optical coherent transceiver 200.

The optical transmission device 204 includes a modulator 211, an optical amplifier 212, a tunable optical filter (TOF) 213, an output unit 214, a transmission-side BS 215, and a photodiode (PD) 216. The modulator 211 optically modulates the data signal, which is the electric signal and which comes from the DSP 206, on the basis of the laser light travelling from the BS 203 and outputs optically-modulated transmission light to the optical amplifier 212. The optical amplifier 212 optically amplifies the transmission light travelling from the modulator 211. The TOF 213 transmits transmission light with a specific wavelength from the transmission light travelling from the optical amplifier 212. The output unit 214 is connected to the optical fiber 207 and outputs the transmission light travelling from the TOF 213 to the optical fiber 207.

The transmission-side BS 215 optically splits a part of the transmission light that has transmitted through the TOF 213. The PD 216 performs electric conversion on the part of transmission light that has been split by the transmission-side BS 215, and detects a level of the transmission light. The control circuit 208 adjusts a passband of the TOF 213 such that the level of the transmission light detected by the PD 216 is maximized. Meanwhile, the TOF 213 that is mounted on the optical coherent transceiver 200 based on Centum gigabit Form factor Pluggable (CFP) standard or CFP2 standard needs to be small in size. In the TOF 213 with a small size, it is difficult to increase a spectral angle of a grating 213B, so that an adjustment tolerance for a reflection angle of a micro electro mechanical systems (MEMS) mirror 213C is reduced. If temperature variation of the reflection angle of the MEMS mirror 213C and temporal variation of an optical system are taken into account, feedback control on a central wavelength of the TOF 213 is performed to adjust the reflection angle of the MEMS mirror 213C.

The optical reception device 205 includes an input unit 221 and a receiver 222. The input unit 221 is connected to the optical fiber 207 and inputs the multiplexed light travelling from the optical fiber 207. The receiver 222 receives reception light from the multiplexed light received from the input unit 221 on the basis of the laser light that has been split by the BS 203, converts the received reception light into a data signal that is an electric signal, and outputs the converted data signal to the DSP 206. Meanwhile, the receiver 222 receives, from the multiplexed light, reception light with the same wavelength as the transmission light that has been optically modulated by the modulator 211.

FIG. 14 is an explanatory diagram illustrating an example of the TOF 213. The TOF 213 includes an input-side collimator 213A, the grating 213B, the MEMS mirror 213C, and an output-side collimator 213D. The input-side collimator 213A inputs multiplexed light including light with a plurality of wavelengths. The grating 213B splits the multiplexed light that is input from the input-side collimator 213A. The MEMS mirror 213C reflects light with a specific wavelength from the wavelengths split by the grating 213B. The output-side collimator 213D outputs the light that has the specific wavelength and that is reflected by the MEMS mirror 213C. In other words, the TOF 213 transmits and outputs the light with the specific wavelength to the output-side collimator 213D from the multiplexed light that is input from the input-side collimator 213A, by adjusting the reflection angle of the MEMS mirror 213C.

FIG. 15 is an explanatory diagram illustrating an example of a change in the central wavelength of the TOF 213. The TOF 213 variably adjusts a passband for transmitting the central wavelength of the TOF 213. FIG. 16 is an explanatory diagram illustrating an example of a relationship between driving voltage and the central wavelength of the TOF 213. The TOF 213 adjusts the central wavelength of the TOF 213 in accordance with driving voltage for adjusting the reflection angle of the MEMS mirror 213C. In other words, the TOF 213 is able to transmit reception light with an arbitrary specific wavelength from the multiplexed light by adjusting the driving voltage applied to the MEMS mirror 213C.

FIG. 17A is an explanatory diagram illustrating an example of transmission light that is an output of the modulator 211. Transmission light a1 illustrated in FIG. 17A is a signal spectrum of the transmission light a1 that is an output of the modulator 211. Meanwhile, the transmission light a1 is a signal spectrum of 1545.3 nanometers (nm), for example.

FIG. 17B is an explanatory diagram illustrating an example of transmission light that is an output of the optical amplifier 212. A modulation loss of the modulator 211 increases with an increase in a bit rate, so that output power of transmission light is reduced. To cope with this, the optical amplifier 212 optically amplifies output power of the transmission light of the modulator 211. Transmission light b1 illustrated in FIG. 17B is a signal spectrum of signal light that is optically amplified by the optical amplifier 212. The optical amplifier 212 produces amplification spontaneous emission (ASE) in a broadband, which is noise, while increasing a signal level of the signal light b1.

FIG. 17C is an explanatory diagram illustrating an example of transmission light that is an output of the TOF 213. The ASE in the broadband becomes noise light for other signal light. To cope with this, the TOF 213 suppresses the ASE other than transmission light d1 and transmits the transmission light d1. The TOF 213 has transmission characteristics for transmitting the transmission light d1 of 1545.3 nm, for example. The transmission light d1 illustrated in FIG. 17C is signal light of 1545.3 nm that has transmitted through the TOF 213, for example. The ASE other than the transmission light d1 is suppressed.

FIG. 17D is an explanatory diagram illustrating an example of multiplexed light that is an input of the receiver 222. Multiplexed light e1 illustrated in FIG. 17D is a signal spectrum of WDM light that includes 16 waves and that is received by the receiver 222, for example.

In the conventional optical coherent transceiver 200, a baud rate increases with an increase in a bit rate. If the baud rate increases, waveform distortion in the optical transmission device 204 and the optical reception device 205 increases. To cope with this, a signal-to-noise (SN) ratio at the time of photoelectric conversion in the receiver 222 is increased to increase an optical input to the receiver 222. For example, if the bit rate is set to 1.2 Tbps, an optical input of about 0 dBm/ch is needed for the receiver 222, for example. In contrast, the multiplexed light input to the optical reception device 205 is, for example, −20 to −5 dBm/ch, so that it is needed to arrange an optical amplifier on an input stage of the receiver 222.

FIG. 18 is an explanatory diagram illustrating an example of a conventional optical coherent transceiver 200A. Meanwhile, the same components as those of the optical coherent transceiver 200 illustrated in FIG. 13 are denoted by the same reference symbols, and explanation of the same components and operation will be omitted. In the optical coherent transceiver 200A illustrated in FIG. 18, a reception-side optical amplifier 223 is arranged between the receiver 222 and the input unit 221. The reception-side optical amplifier 223 optically amplifies the multiplexed light travelling from the input unit 221, and outputs the optically-amplified multiplexed light to the receiver 222.

The reception-side optical amplifier 223 performs constant gain control of flattening a gain at each of the wavelengths in the multiplexed light travelling from the input unit 221. As a result, in the receiver 222, even if the baud rate increases with an increase in the bit rate, the reception-side optical amplifier 223 is able to reduce wavelength distortion by flattening the gain at each of the wavelengths in the multiplexed light.

Patent Literature 1: Japanese Laid-open Patent Publication No. 2010-123698

Patent Literature 2: Japanese Laid-open Patent Publication No. 2016-154297

Patent Literature 3: International Publication Pamphlet No. 2015/004828

The reception-side optical amplifier 223 performs the constant gain control to flatten the gain at each of the wavelengths in the multiplexed light. A maximum output of the reception-side optical amplifier 223 is 27 dBm by adding a dynamic range of 15 dB (−20 to −5 dBm/ch) of an input power of an optical reception device 205A and a dynamic range of 12 dB (1 to 16 waves) of the number of wavelengths to an input power of 0 dBm/ch of the receiver 222. In other words, the reception-side optical amplifier 223 that performs the gain constant control at each of the wavelengths in the multiplexed light needs the maximum output of 27 dBm.

However, while it is technically possible to implement an optical amplifier with a maximum output of 27 dBm, high excitation light power is needed and a size of a heat dissipation structure is increased because of a thermal design issue, so that it is difficult to arrange the optical amplifier with 27 dBm in the optical reception device 205. In other words, the realities are that an optical coherent transceiver that is able to handle signal light at a high bit rate without using a high-output optical amplifier is needed.

SUMMARY

According to an aspect of an embodiment, an optical coherent transceiver includes a modulator, a receiver, a tunable filter, a splitter, a detector and a control circuit. The modulator optically modulates a data signal on the basis of laser light and outputs transmission light. The receiver receives reception light with same wavelength as the transmission light from input multiplexed light, on the basis of the laser light. The tunable filter is arranged on an input stage of the receiver. The tunable filter includes a first port, a filter body and a second port. The first port inputs the multiplexed light. The filter body transmits the reception light from the multiplexed light. The second port outputs the reception light that has transmitted through the filter body. The splitter optically splits a part of the transmission light travelling from the modulator and inputs the part of the transmission light from the second port of the tunable filter. The detector detects a level of the part of the transmission light input from the second port of the tunable filter. The control circuit adjusts a passband of the tunable filter on the basis of the level of the part of the transmission light detected by the detector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Comparative Example

An optical coherent transceiver 100 according to a comparative example may be adopted, in which a TOF that transmits reception light with a specific wavelength from multiplexed light is arranged on an input state of a low-output reception-side optical amplifier in an optical reception device instead of arranging the high-output reception-side optical amplifier 223 in the optical reception device 205A.

Figure 10:
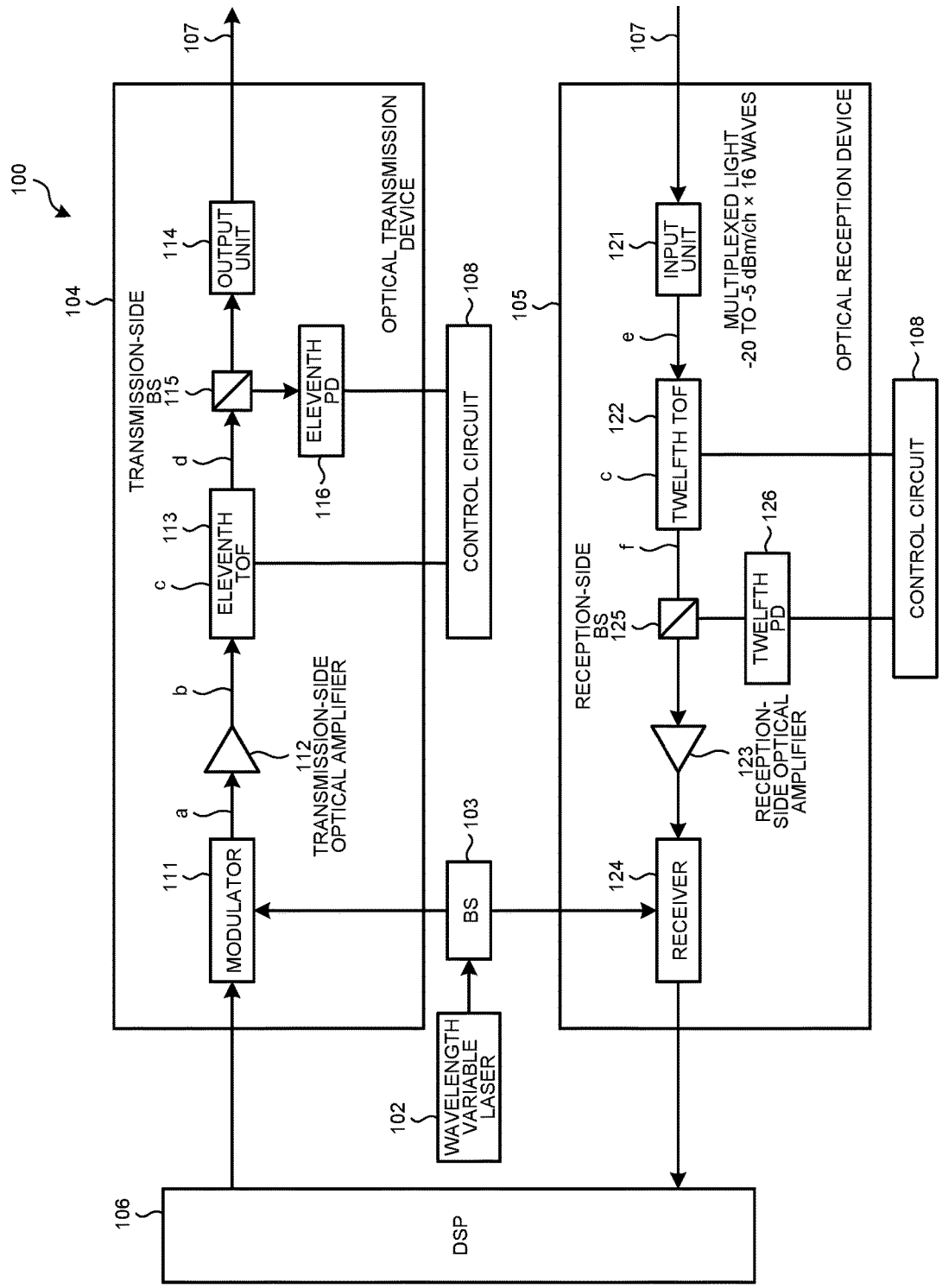
FIG. 10 is an explanatory diagram illustrating an example of an optical coherent transceiver of a comparative example.

FIG. 10 is an explanatory diagram illustrating an example of the optical coherent transceiver 100 of the comparative example. The optical coherent transceiver 100 illustrated in FIG. 10 includes a wavelength variable laser 102, a BS 103, an optical transmission device 104, an optical reception device 105, a DSP 106, and a control circuit 108. The wavelength variable laser 102 emits laser light. The BS 103 optically splits the laser light travelling from the wavelength variable laser 102 toward the optical transmission device 104 and the optical reception device 105. The DSP 106 performs signal processing on a data signal that is an electric signal, transmits the data signal subjected to the signal processing to the optical transmission device 104, receives a data signal from the optical reception device 105, and performs signal processing on the received data signal. Meanwhile, the signal processing is certain signal processing, such as waveform distortion compensation or a wavelength dispersion process, for example. The optical transmission device 104 is connected to an optical fiber 107 and transmits transmission light to the optical fiber 107. The optical reception device 105 is connected to the optical fiber 107 and receives multiplexed light from the optical fiber 107. The control circuit 108 controls the entire optical coherent transceiver 100.

The optical transmission device 104 includes a modulator 111, a transmission-side optical amplifier 112, an eleventh TOF 113, an output unit 114, a transmission-side BS 115, and an eleventh PD 116. The modulator 111 optically modulates the data signal, which is an electric signal and which comes from the DSP 106, on the basis of the laser light travelling from the BS 103 and outputs optically-modulated transmission light to the transmission-side optical amplifier 112. The transmission-side optical amplifier 112 optically amplifies the transmission light travelling from the modulator 111. The eleventh TOF 113 transmits transmission light with a specific wavelength from the transmission light travelling from the transmission-side optical amplifier 112. The output unit 114 is connected to the optical fiber 107 and outputs the transmission light travelling from the eleventh TOF 113 to the optical fiber 107.

The transmission-side BS 115 optically splits a part of the transmission light that has transmitted through the eleventh TOF 113. The eleventh PD 116 performs electric conversion on the part of transmission light that has been split by the transmission-side BS 115, and detects a level of the transmission light. The control circuit 108 adjusts a passband of the eleventh TOF 113 such that the level of the transmission light detected by the eleventh PD 116 is maximized.

The optical reception device 105 includes an input unit 121, a twelfth TOF 122, a reception-side optical amplifier 123, a receiver 124, a reception-side BS 125, and a twelfth PD 126. The input unit 121 is connected to the optical fiber 107 and inputs the multiplexed light travelling from the optical fiber 107. The twelfth TOF 122 transmits reception light with a specific wavelength from the multiplexed light travelling from the input unit 121. Meanwhile, a signal that has transmitted through the twelfth TOF 122 is the multiplexed light that includes a peak of the reception light with the specific wavelength. The reception-side optical amplifier 123 optically amplifies the reception light that has transmitted through the twelfth TOF 122, and outputs the optically-amplified reception light to the receiver 124. Meanwhile, the reception-side optical amplifier 123 is able to realize the reception light with a specific single wavelength that has transmitted through the twelfth TOF 122, by auto level control at 0 dBm/ch.

The receiver 124 receives the optically-amplified reception light on the basis of the laser light that has been split by the BS 103, converts the received reception light into a data signal that is an electric signal, and outputs the converted data signal to the DSP 106.

The reception-side BS 125 optically splits a part of the reception light that has transmitted through the twelfth TOF 122. The twelfth PD 126 performs electric conversion on the part of reception light that has been split by the reception-side BS 125, and detects a level of the reception light. The control circuit 108 adjusts a passband of the twelfth TOF 122 such that the level of the reception light detected by the twelfth PD 126 is maximized.

In the comparative example, the twelfth TOF 122 that transmits the reception light with the specific wavelength from the multiplexed light is arranged on an input stage of the reception-side optical amplifier 123 in the optical reception device 105. As a result, the reception-side optical amplifier 123 controls output of the reception light that has the single wavelength and that has transmitted through the twelfth TOF 122, so that the conventional constant gain control on 16 wavelengths is not needed. As a result, the reception-side optical amplifier 223 with 27 dBm as described in the conventional technology is not needed.

Figure 11:
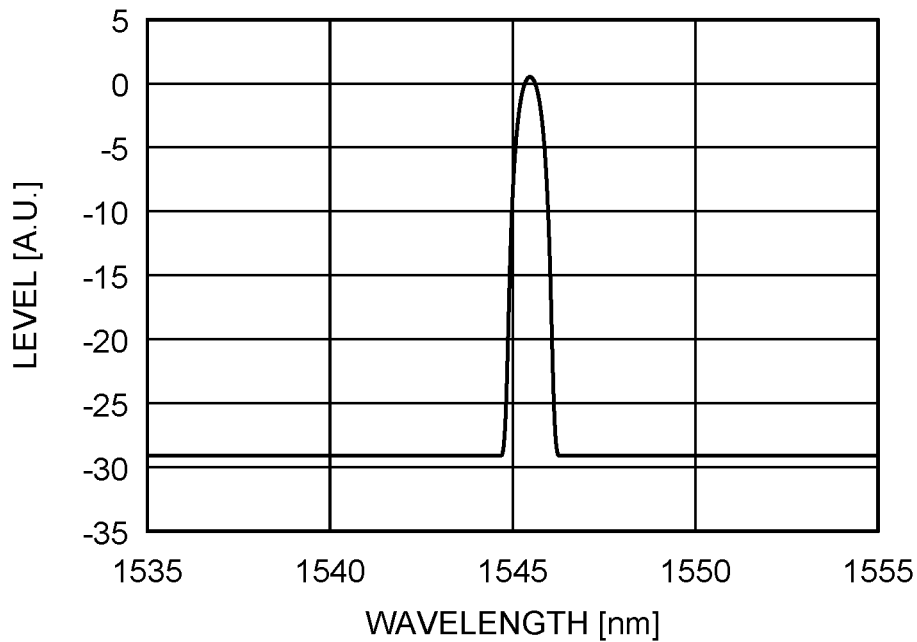
FIG. 11 is an explanatory diagram illustrating an example of a level that is monitored by an eleventh monitor at a side of an eleventh TOF of the comparative example.

FIG. 11 is an explanatory diagram illustrating an example of the level that is monitored by the eleventh PD 116 at a side of the eleventh TOF 113 of the comparative example. The explanatory diagram in FIG. 11 illustrates the level that is monitored by the eleventh PD 116 when scanning is performed at 1535 nm to 1555 nm while changing driving voltage of the eleventh TOF 113. A wavelength at which the level is maximized is a transmission wavelength of 1545.3 nm. As a result, by detecting the maximum level monitored by the eleventh PD 116 and controlling the MEMS mirror in the eleventh TOF 113 at the driving voltage at which the level is maximized, it is possible to adjust the central wavelength of the eleventh TOF 113 to the transmission wavelength.

Figure 12:
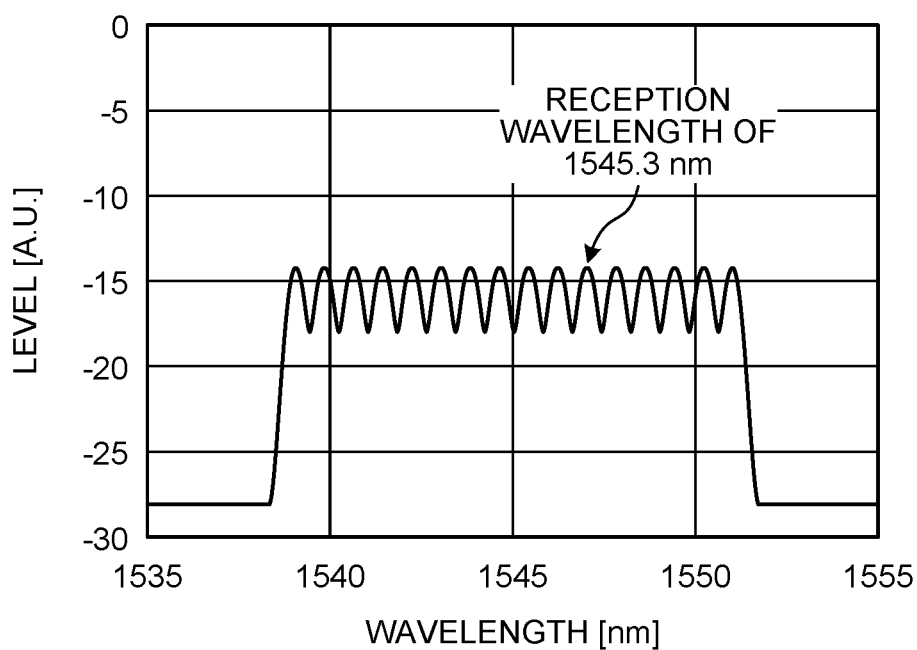
FIG. 12 is an explanatory diagram illustrating an example of a level that is monitored by a twelfth monitor at a side of a twelfth TOF of the comparative example.
Figure 13:
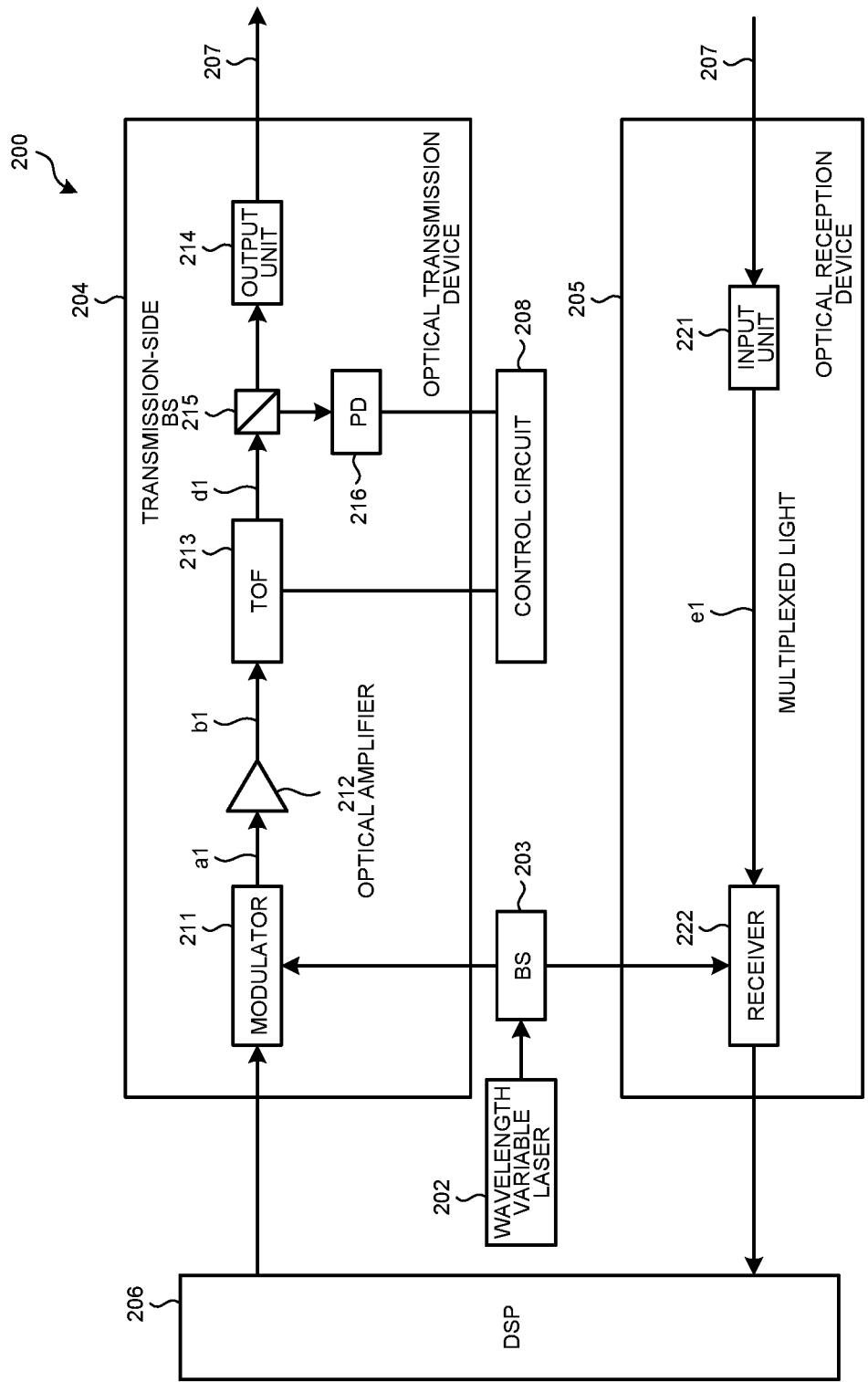
FIG. 13 is an explanatory diagram illustrating an example of a conventional optical coherent transceiver.
Figure 14:
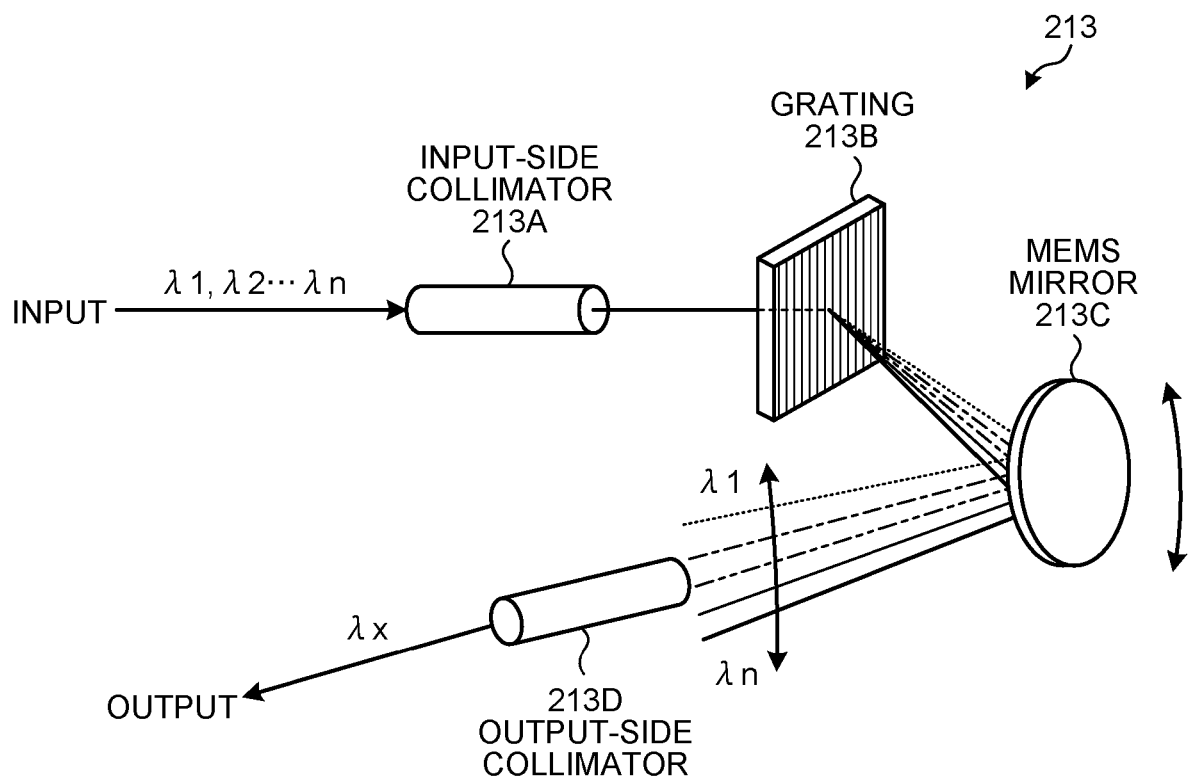
FIG. 14 is an explanatory diagram illustrating an example of a TOF.
Figure 15:
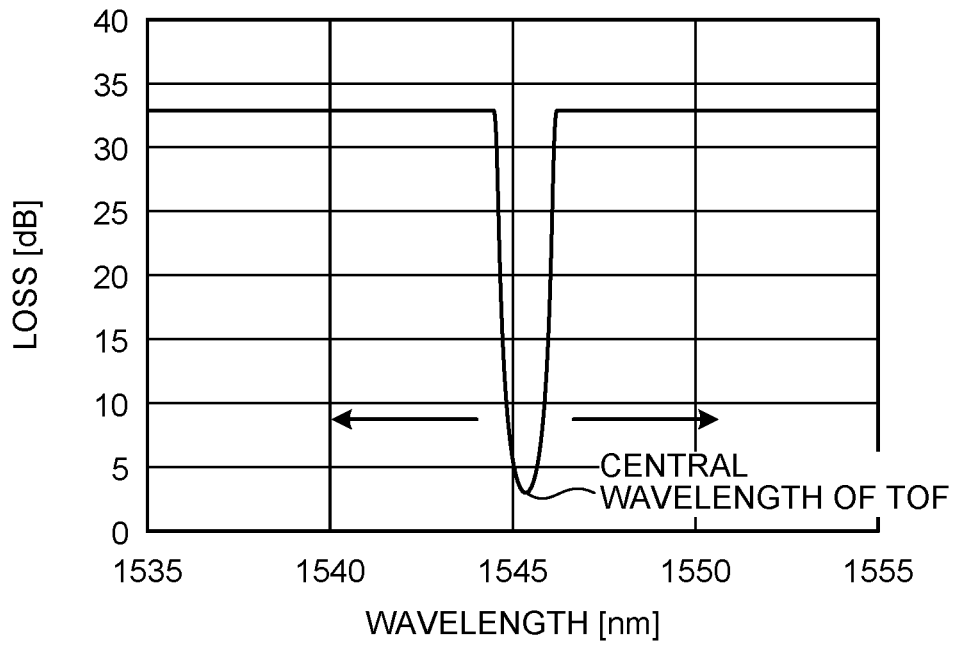
FIG. 15 is an explanatory diagram illustrating an example of a change in a central wavelength of the TOF.

FIG. 12 is an explanatory diagram illustrating an example of the level that is monitored by the twelfth PD 126 at a side of the twelfth TOF 122 of the comparative example. FIG. 12 illustrates the level that is monitored by the twelfth PD 126 when scanning is performed at 1535 nm to 1555 nm while changing driving voltage of the twelfth TOF 122. Due to the input of the multiplexed light, a plurality of peaks of levels monitored by the twelfth PD 126 are present, so that it is difficult to adjust the central wavelength of the twelfth TOF 122 to a reception wavelength of 1545.3 nm.

Therefore, an embodiment of an optical coherent transceiver that is able to easily transmit reception light with a single wavelength from multiplexed light even with use of the twelfth TOF 122 at the side of the optical reception device 105 will be described below as a first embodiment. Meanwhile, the disclosed technology is not limited by the embodiments below. Further, the embodiments described below may be combined appropriately as long as no contradiction is derived.

[a] First Embodiment

Figure 1:
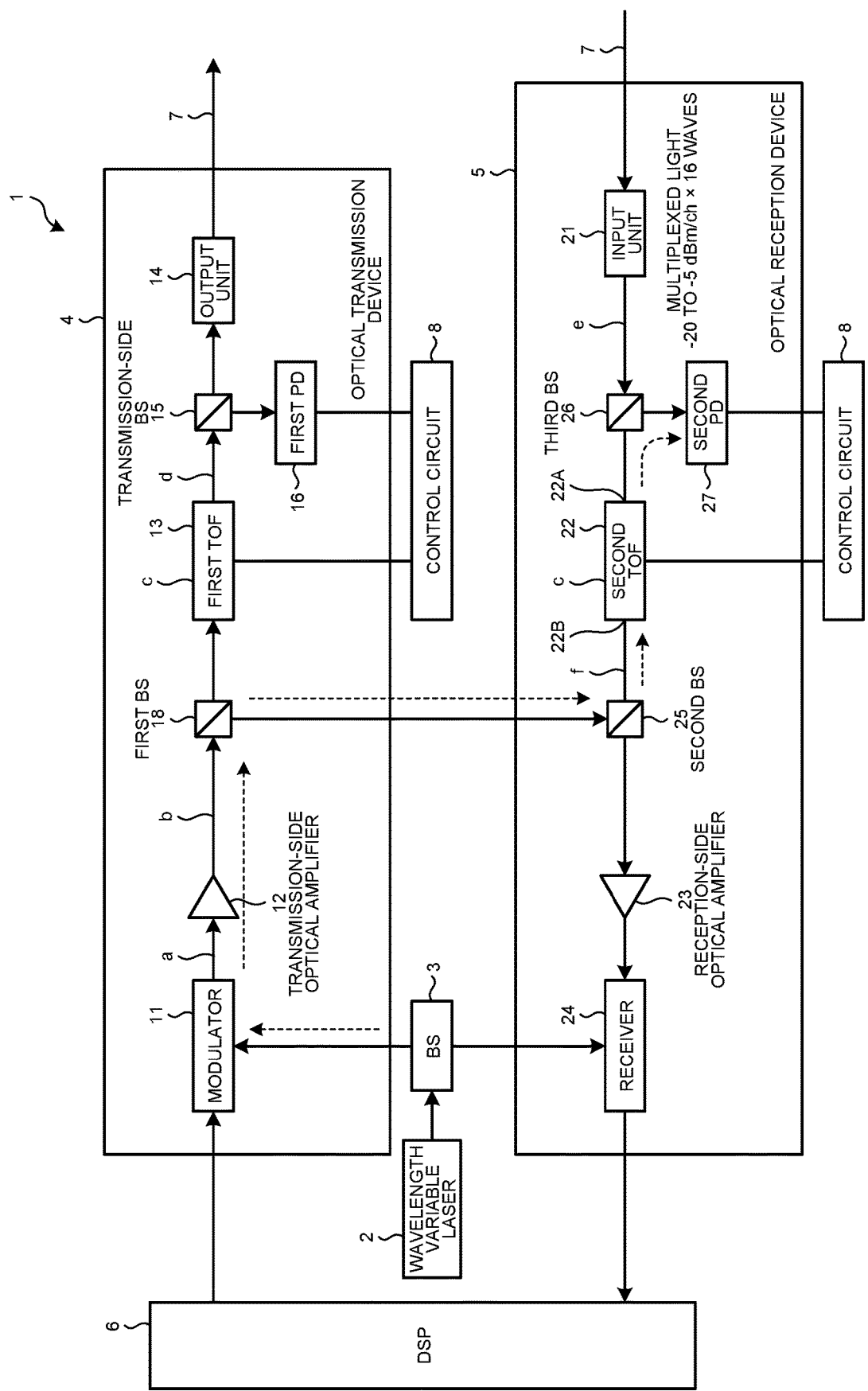
FIG. 1 is an explanatory diagram illustrating an example of an optical coherent transceiver of a first embodiment.

FIG. 1 is an explanatory diagram illustrating an example of an optical coherent transceiver 1 of the first embodiment. The optical coherent transceiver 1 illustrated in FIG. 1 includes a wavelength variable laser 2, a BS 3, an optical transmission device 4, an optical reception device 5, a DSP 6, and a control circuit 8. The wavelength variable laser 2 is a laser that emits laser light. The BS 3 splits the laser light travelling from the wavelength variable laser 2 toward the optical transmission device 4 and the optical reception device 5. The DSP 6 performs signal processing on a data signal that is an electric signal, transmits the data signal subjected to the signal processing to the optical transmission device 4, receives a data signal from the optical reception device 5, and performs signal processing on the received data signal. Meanwhile, the signal processing is certain signal processing, such as waveform distortion compensation or a wavelength dispersion process, for example. The optical transmission device 4 is connected to an optical fiber 7 and transmits transmission light to the optical fiber 7. The optical reception device 5 is connected to the optical fiber 7 and receives multiplexed light from the optical fiber 7. Meanwhile, the number of wavelengths of the multiplexed light is, for example, 1 to 16. The control circuit 8 controls the entire optical coherent transceiver 1.

The optical transmission device 4 includes a modulator 11, a transmission-side optical amplifier 12, a first TOF 13, an output unit 14, a transmission-side BS 15, a first PD 16, and a first BS 18. The modulator 11 optically modulates the data signal, which is an electric signal and which comes from the DSP 6, on the basis of the laser light travelling from the BS 3 and outputs optically-modulated transmission light to the transmission-side optical amplifier 12. The transmission-side optical amplifier 12 optically amplifies the transmission light travelling from the modulator 11. The first TOF 13 transmits transmission light with a specific wavelength from the transmission light travelling from the transmission-side optical amplifier 12. The output unit 14 is connected to the optical fiber 7 and outputs the transmission light travelling from the first TOF 13 to the optical fiber 7.

The transmission-side BS 15 optically splits a part of the transmission light that has transmitted through the first TOF 13. The first PD 16 performs electric conversion on the part of transmission light that has been split by the transmission-side BS 15, and detects a level of the transmission light. The control circuit 8 adjusts a passband of the first TOF 13 such that the level of the transmission light detected by the first PD 16 is maximized. The first BS 18 is a first splitter that optically splits a part of the transmission light, which travels from the transmission-side optical amplifier 12 to the first TOF 13, toward a second BS 25.

The optical reception device 5 includes an input unit 21, a second TOF 22, a reception-side optical amplifier 23, a receiver 24, the second BS 25, a third BS 26, and a second PD 27. The input unit 21 is connected to the optical fiber 7 and inputs multiplexed light travelling from the optical fiber 7. The second TOF 22 is a tunable filter that transmits reception light with a specific wavelength from the multiplexed light travelling from the input unit 21. The second TOF 22 includes a first port 22A and a second port 22B. The first port 22A is a port that is connected to the third BS 26 and inputs the multiplexed light. The second port 22B is a port that is connected to the second BS 25 and outputs the transmitted reception light to the second BS 25. The reception-side optical amplifier 23 is an optical amplifier that optically amplifies the reception light that has transmitted through the second TOF 22, and outputs the optically-amplified reception light to the receiver 24. The reception-side optical amplifier 23 performs optical amplification by using auto level control (ALC) of controlling transmitted reception light with a single wavelength. In other words, in the reception-side optical amplifier 23, it is not needed to use the constant gain control as described above in the "Background" section, and it is possible to adopt an optical amplifier with low output power.

The receiver 24 receives the optically-amplified reception light on the basis of the laser light that has been split by the BS 3, converts the received reception light to a data signal that is an electric signal, and outputs the converted data signal to the DSP 6.

The second BS 25 is a second splitter that inputs the part of the transmission light that has been split by the first BS 18, in an opposite direction from an output stage of the second TOF 22. The third BS 26 is a third splitter that optically splits a part of the transmission light that has transmitted through the second TOF 22. The second PD 27 is a detection unit that inputs a part of the transmission light that travels through the first BS 18, the second BS 25, the second TOF 22, and the third BS 26 and that is optically amplified by the transmission-side optical amplifier 12. The second PD 27 performs electric conversion on the part of the transmission light that has been split by the third BS 26, and detects a level of the transmission light. The control circuit 8 adjusts a passband of the second TOF 22 such that the level of the transmission light detected by the second PD 27 is maximized. Meanwhile, the receiver 24 receives, from the multiplexed light, reception light with the same wavelength as the transmission light that is optically modulated by the modulator 11.

Figure 2:
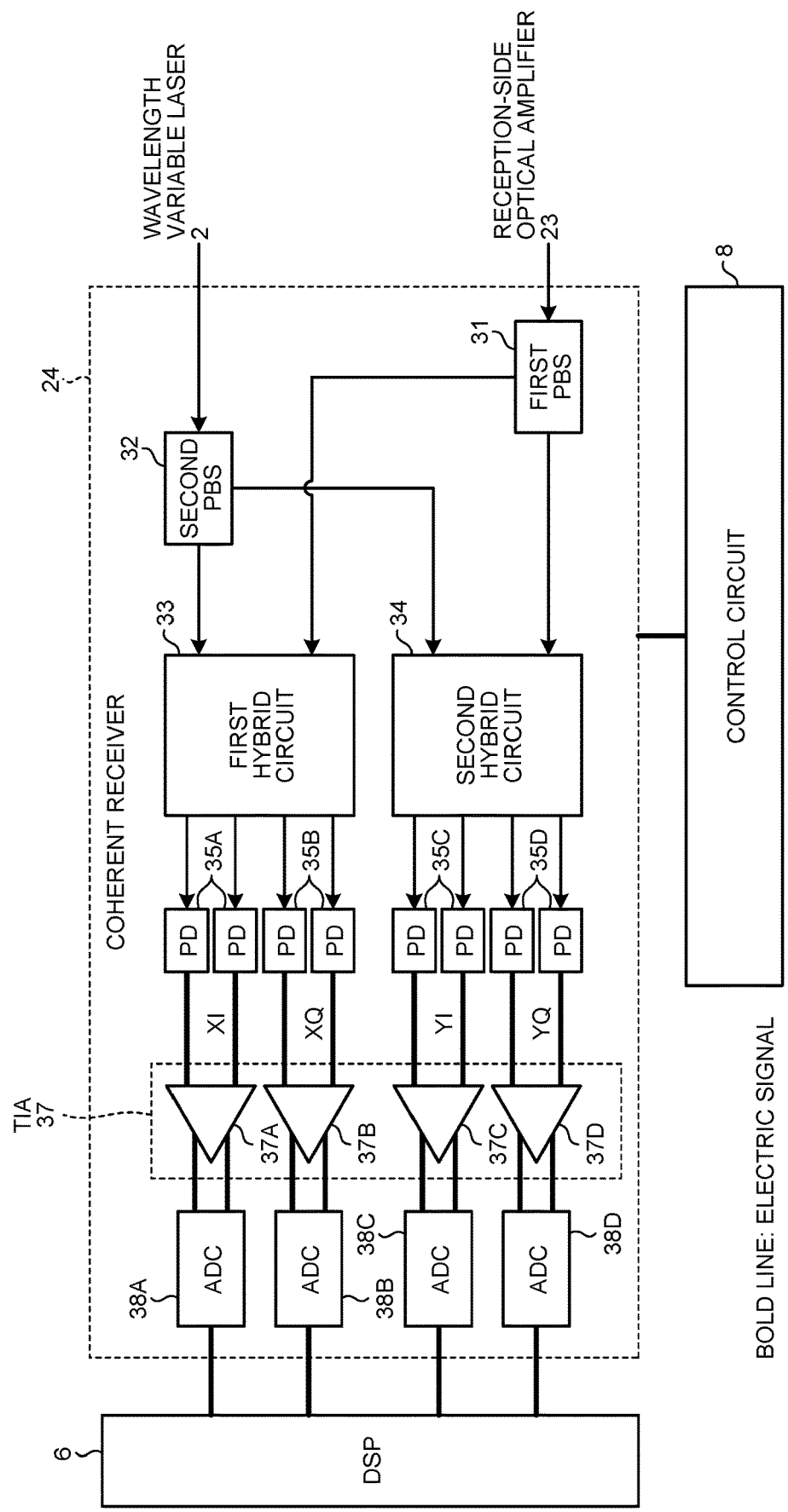
FIG. 2 is an explanatory diagram illustrating an example of a receiver of the first embodiment.

FIG. 2 is an explanatory diagram illustrating an example of the receiver 24 of the first embodiment. The receiver 24 illustrated in FIG. 2 includes a first PBS 31, a second PBS 32, a first hybrid circuit 33, a second hybrid circuit 34, PDs 35A and 35B on an X-side, and PDs 35C and 35D on a Y-side. The receiver 24 further includes four trans impedance amplifiers (TIA) 37 and four analog-to-digital converters (ADCs) 38.

The first PBS 31 separates the reception light into an X-polarized component and a Y-polarized component. The first PBS 31 outputs the X-polarized component of the reception light to the first hybrid circuit 33, and outputs the Y-polarized component of the reception light to the second hybrid circuit 34. The second PBS 32 separates the laser light travelling from the wavelength variable laser 2 into an X-polarized component and a Y-polarized component. The second PBS 32 outputs the X-polarized component of the laser light to the first hybrid circuit 33, and outputs the Y-polarized component of the laser light to the second hybrid circuit 34.

The first hybrid circuit 33 causes the X-polarized component of the laser light to interfere with the X-polarized component of the reception light, and extracts optical signals of an I component and a Q component from the reception light of the X-polarized component. Meanwhile, the I component is an in-phase component and the Q component is a quadrature component. The first hybrid circuit 33 outputs the optical signal of the I component in the X-polarized component of the reception light to the PD 35A. The first hybrid circuit 33 outputs the optical signal of the Q component in the X-polarized component of the reception light to the PD 35B.

The second hybrid circuit 34 causes the Y-polarized component of the laser light to interfere with the Y-polarized component of the reception light, and extracts optical signals of the I component and the Q component from the reception light of the Y-polarized component. The second hybrid circuit 34 outputs the optical signal of the I component in the Y-polarized component of the reception light to the PD 35C. The second hybrid circuit 34 outputs the optical signal of the Q component in the Y-polarized component of the reception light to the PD 35D.

The PD 35A performs electric conversion on the optical signal of the I component of the X-polarized component coming from the first hybrid circuit 33. A TIA 37A adjusts a gain of the electric signal of the I component of the X-polarized component of the PD 35A. An ADC 38A performs digital conversion on the electric signal for which the gain is adjusted by the TIA 37A, and outputs the electric signal that is subjected to the digital conversion to the DSP 6.

The PD 35B performs electric conversion on the optical signal of the Q component of the X-polarized component coming from the first hybrid circuit 33. A TIA 37B adjusts a gain of the electric signal of the Q component of the X-polarized component of the PD 35B. An ADC 38B performs digital conversion on the electric signal for which the gain is adjusted by the TIA 37B, and outputs the electric signal that is subjected to the digital conversion to the DSP 6.

The PD 35C performs electric conversion on the optical signal of the I component of the Y-polarized component coming from the second hybrid circuit 34. A TIA 37C adjusts a gain of the electric signal of the I component of the Y-polarized component of the PD 35C. An ADC 38C performs digital conversion on the electric signal for which the gain is adjusted by the TIA 37C, and outputs the electric signal that is subjected to the digital conversion to the DSP 6.

The PD 35D performs electric conversion on the optical signal of the Q component of the Y-polarized component coming from the second hybrid circuit 34. A TIA 37D adjusts a gain of the electric signal of the Q component of the Y-polarized component of the PD 35D. An ADC 38D performs digital conversion on the electric signal for which the gain is adjusted by the TIA 37D, and outputs the electric signal that is subjected to the digital conversion to the DSP 6. The DSP 6 performs signal processing, such as distortion correction or error correction on reception data including data of the I component and the Q component of the X-polarized component and data of the I component and the Q component of the Y-polarized component.

Figure 3A:
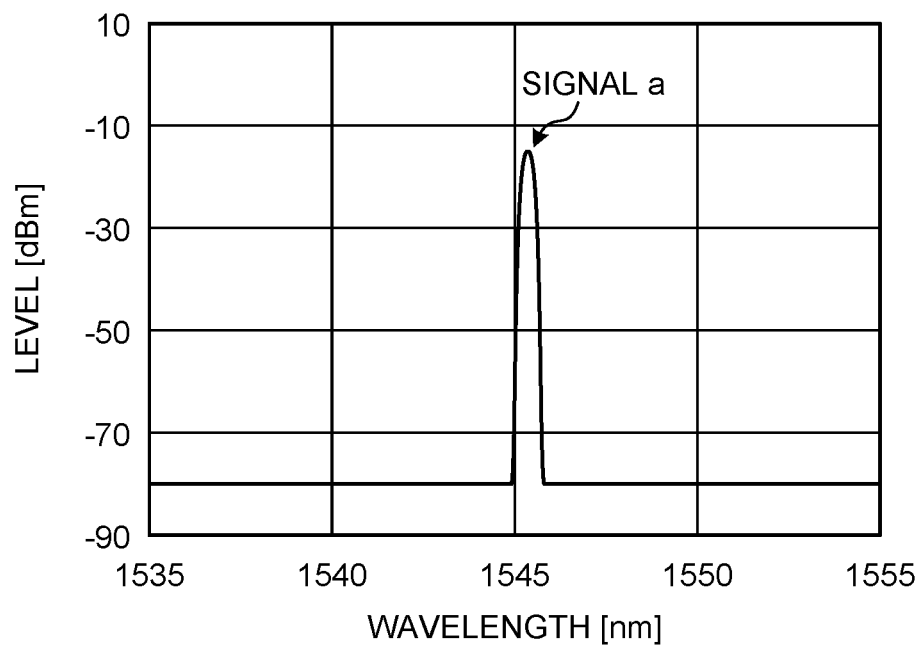
FIG. 3A is an explanatory diagram illustrating an example of transmission light that is an output of a modulator.

FIG. 3A is an explanatory diagram illustrating an example of transmission light that is an output of the modulator 11. Transmission light a illustrated in FIG. 3A is a signal spectrum of the transmission light a that is an output of the modulator 11. Meanwhile, the transmission light a is a signal spectrum at 1545.3 nm, for example.

Figure 3B:
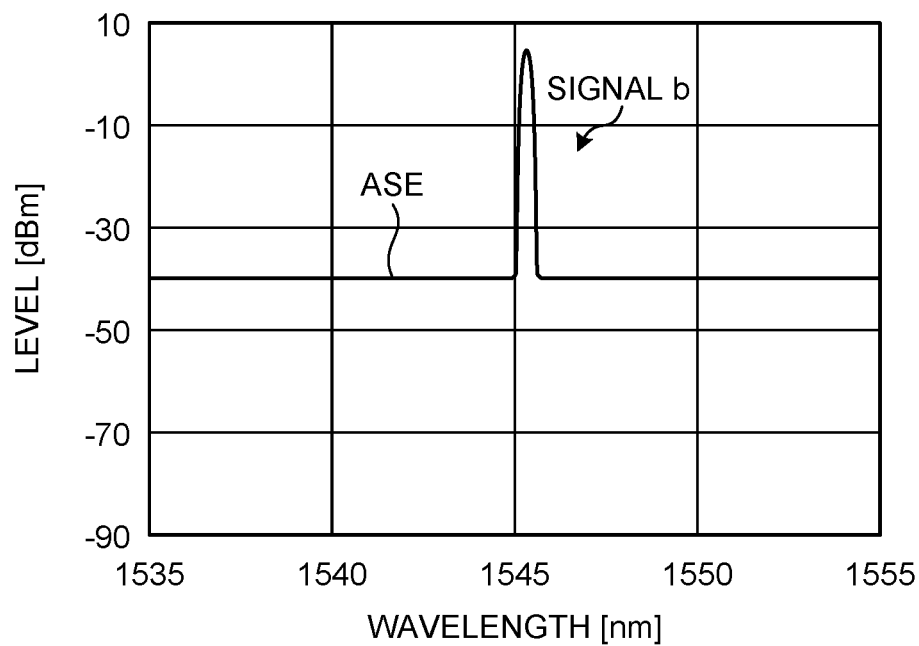
FIG. 3B is an explanatory diagram illustrating an example of transmission light that is an output of a transmission-side optical amplifier.

FIG. 3B is an explanatory diagram illustrating an example of transmission light that is an output of the transmission-side optical amplifier 12. Transmission light b illustrated in FIG. 3B is a signal spectrum of signal light that is optically amplified by the transmission-side optical amplifier 12. The transmission-side optical amplifier 12 produces ASE in a broadband, which is noise, while increasing a signal level of the signal light b.

Figure 3C:
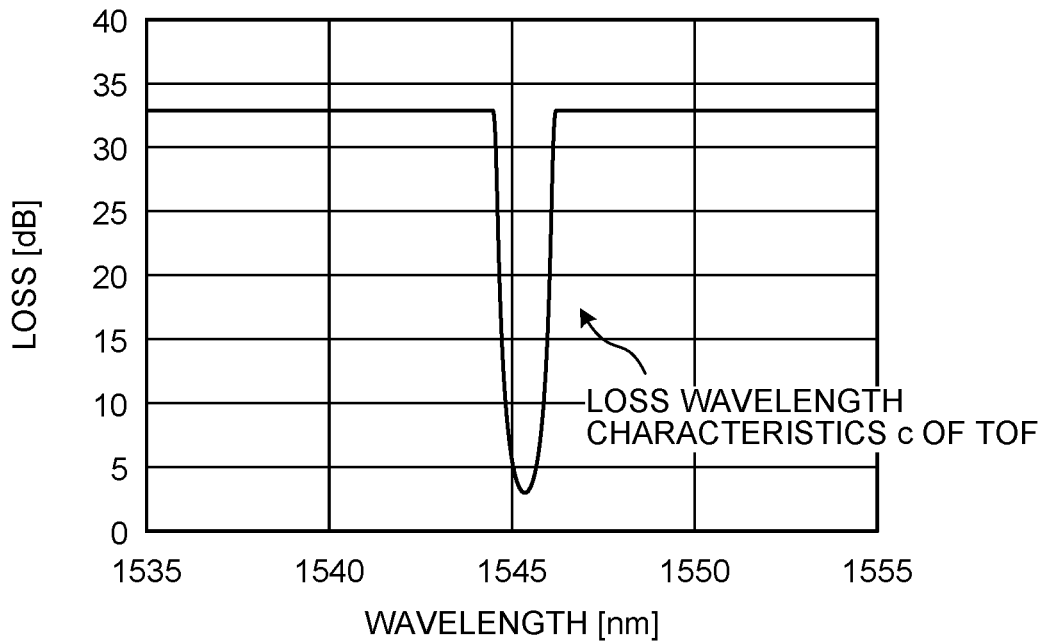
FIG. 3C is an explanatory diagram illustrating an example of loss wavelength characteristics of a first TOF.
Figure 3D:
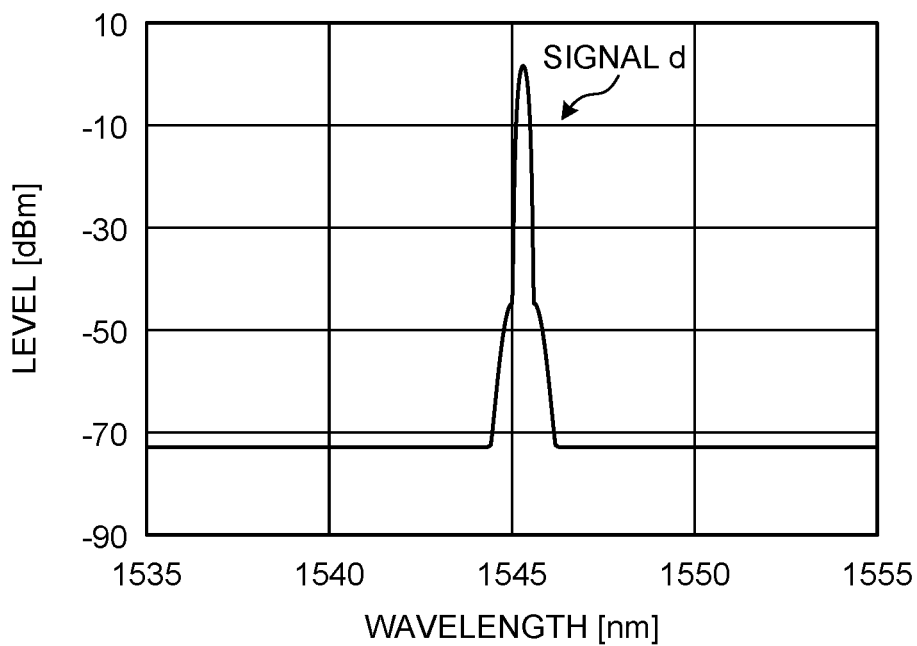
FIG. 3D is an explanatory diagram illustrating an example of transmission light that is an output of the first TOF.

FIG. 3C is an explanatory diagram illustrating an example of loss wavelength characteristics of the first TOF 13. Loss wavelength characteristics c illustrated in FIG. 3C is loss wavelength characteristics of the first TOF 13. FIG. 3D is an explanatory diagram illustrating an example of transmission light that is an output of the first TOF 13. The first TOF 13 suppresses ASE other than transmission light d because the ASE in the broadband becomes noise light. The first TOF 13 has transmission characteristics for transmitting the transmission light d of 1545.3 nm, for example. The transmission light d illustrated in FIG. 3D is signal light of 1545.3 nm that has transmitted through the first TOF 13, for example. The ASE other than the transmission light d is suppressed.

Figure 3E:
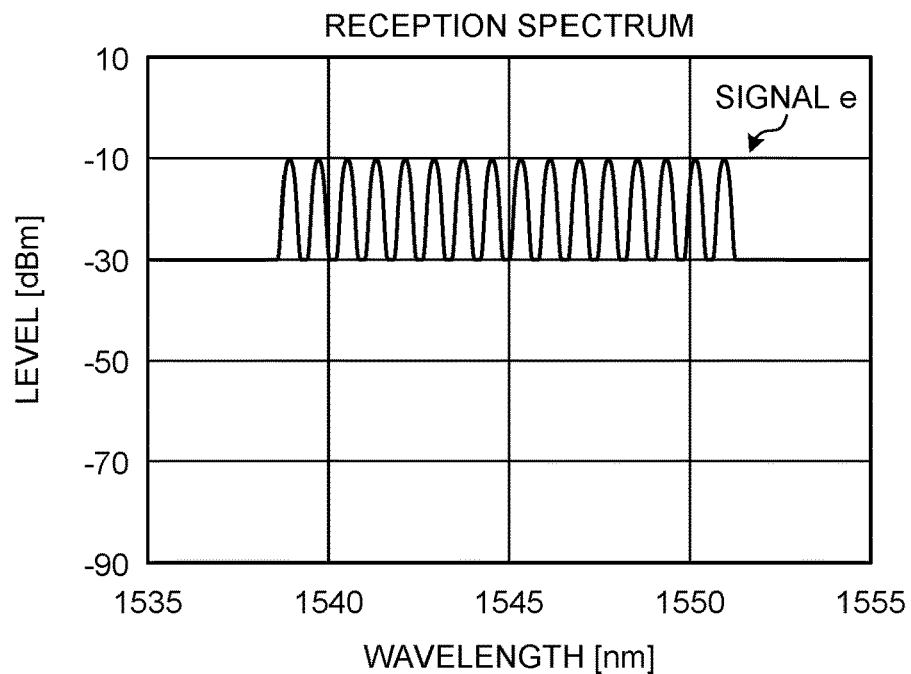
FIG. 3E is an explanatory diagram illustrating an example of multiplexed light that is an input of a second TOF.

FIG. 3E is an explanatory diagram illustrating an example of multiplexed light that is an input of the second TOF 22. The multiplexed light illustrated in FIG. 3E is multiplexed light that is an input of the second TOF 22. Multiplexed light e illustrated in FIG. 3E is a signal spectrum of WDM light with 16 waves and that is input to the second TOF 22.

Figure 3F:
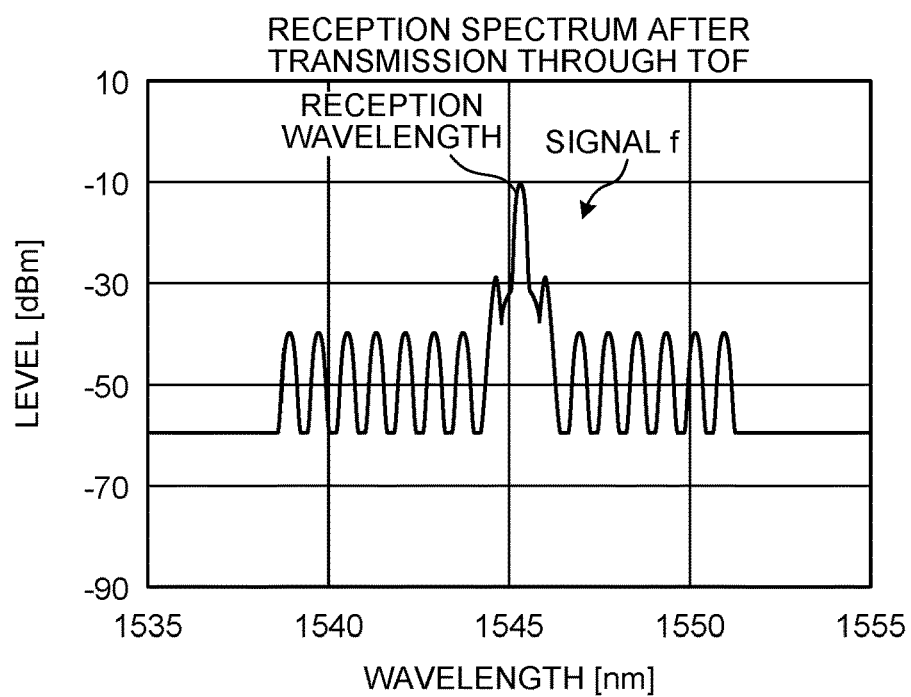
FIG. 3F is an explanatory diagram illustrating an example of transmitted multiplexed light that is an output of the second TOF.

FIG. 3F is an explanatory diagram illustrating an example of transmitted multiplexed light that is an output of the second TOF 22. Multiplexed light f illustrated in FIG. 3F is transmitted multiplexed light that is an output of the second TOF 22. The transmitted multiplexed light f illustrated in FIG. 3F is a signal spectrum in which the signal wavelengths of the 16 waves are of course present and a peak of a wavelength corresponding to the reception light among peaks of the signal wavelengths of the 16 waves is a maximum peak. As for the multiplexed light f that has transmitted through the second TOF 22 as illustrated in FIG. 3F, signals other than the wavelength corresponding to the reception light is suppressed by 20 dB or more as compared to the multiplexed light e illustrated in FIG. 3E. As a result, the reception-side optical amplifier 23 is able to perform optical amplification by using the auto level control of controlling output of reception light with a single wavelength in the transmitted multiplexed light f. Consequently, it is sufficient to adopt an optical amplifier with low output power as the reception-side optical amplifier 23, instead of using an optical amplifier with high output power as described above in relation to the problem with the conventional technology.

Figure 4:
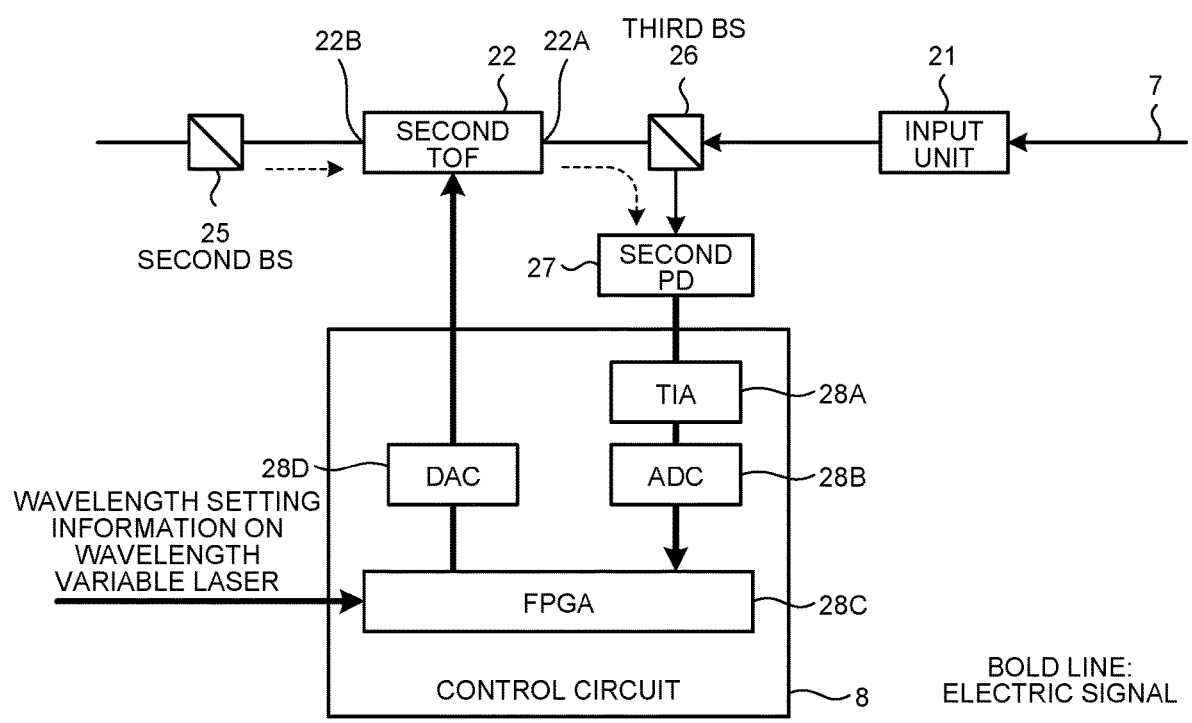
FIG. 4 is an explanatory diagram illustrating an example of a control circuit.

FIG. 4 is an explanatory diagram illustrating an example of the control circuit 8. The control circuit 8 illustrated in FIG. 4 includes a TIA 28A, an ADC 28B, a field programmable gate array (FPGA) 28C, and a digital-to-analog converter (DAC) 28D. The TIA 28A adjusts a gain of the part of the electric signal of the transmission light detected by the second PD 27. The ADC 28B performs digital conversion on the electric signal for which the gain is adjusted. The FPGA 28C outputs, to the DAC 28D, a driving voltage value for adjusting a reflection angle of an MEMS mirror in the second TOF 22 such that the level of the transmission light that is the electric signal subjected to the digital conversion is maximized. The DAC 28D performs analog conversion on the driving voltage value obtained from the FPGA 28C, and supplies the driving voltage subjected to the analog conversion to the MEMS mirror in the second TOF 22. As a result, the second TOF 22 transmits the reception light from the multiplexed light such that the reception light with the same wavelength as that of the transmission light is maximized.

Figure 5:
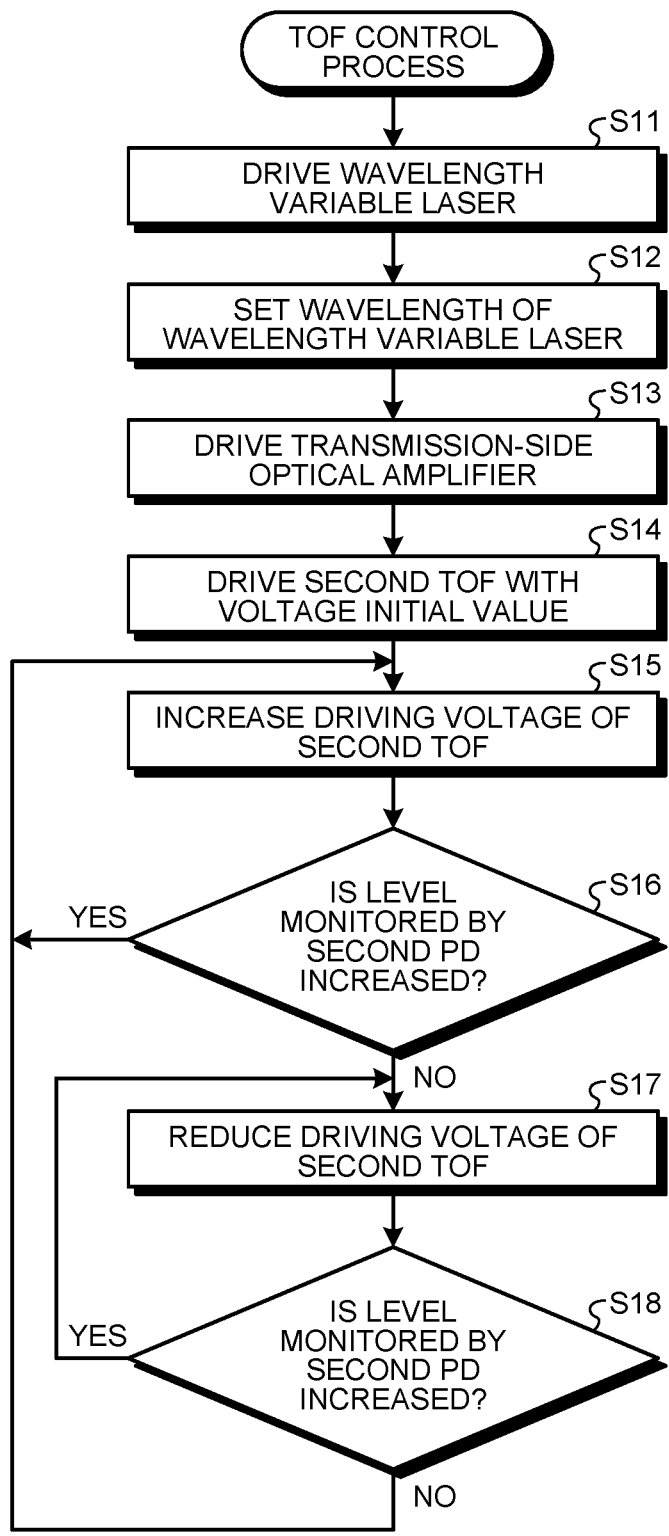
FIG. 5 is a flowchart illustrating an example of processing operation performed by the control circuit in relation to a TOF control process.

FIG. 5 is a flowchart illustrating an example of processing operation performed by the control circuit 8 in relation to a TOF control process. The FPGA 28C in the control circuit 8 drives the wavelength variable laser 2 (Step S11). The FPGA 28C sets a wavelength of laser light in the wavelength variable laser 2 (Step S12).

Figure 16:
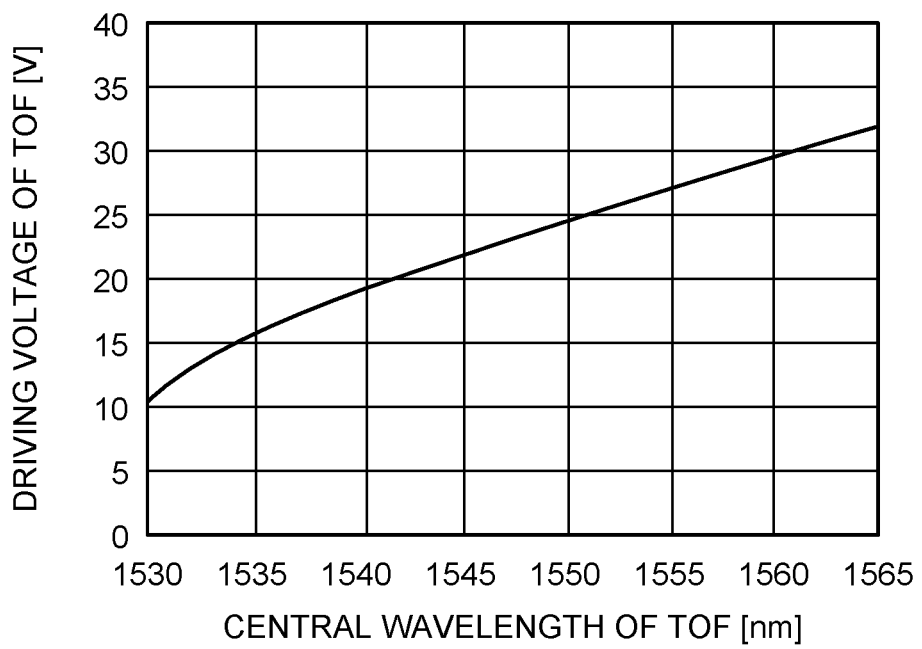
FIG. 16 is an explanatory diagram illustrating an example of a relationship between driving voltage and the central wavelength of the TOF.
Figure 17A:
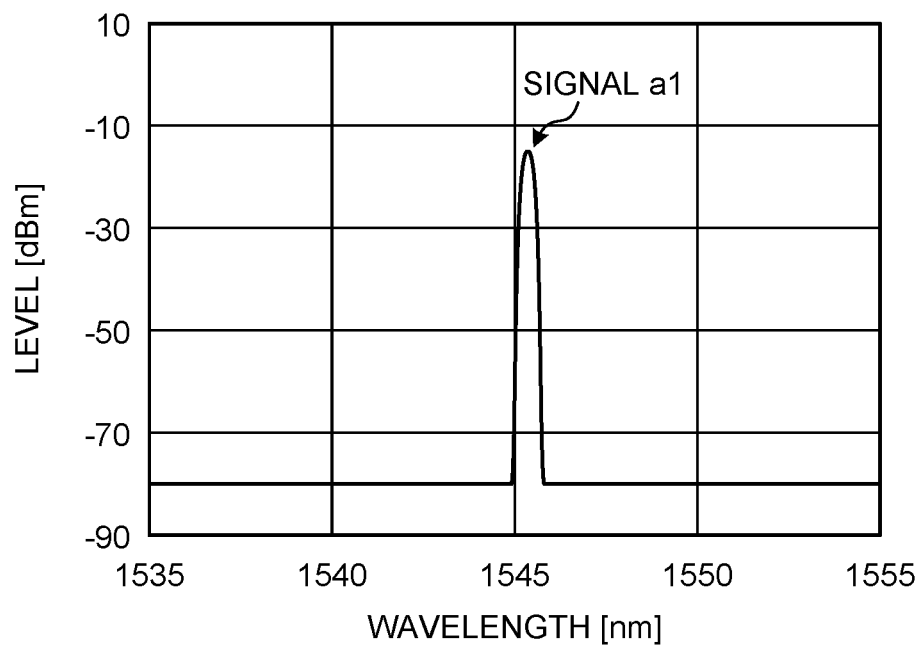
FIG. 17A is an explanatory diagram illustrating an example of transmission light that is an output of a modulator.
Figure 17B:
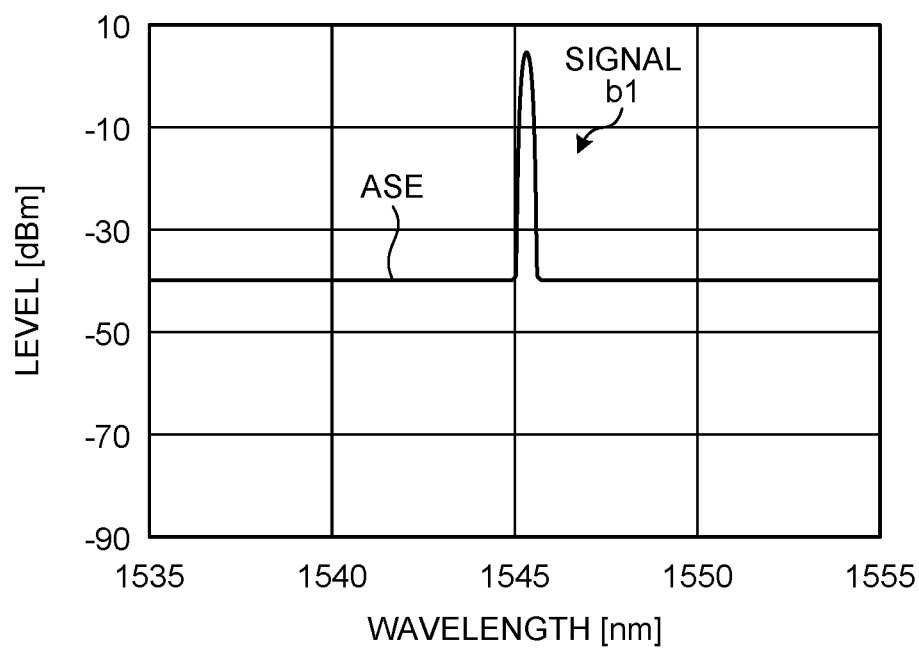
FIG. 17B is an explanatory diagram illustrating an example of transmission light that is an output of an optical amplifier.
Figure 17C:
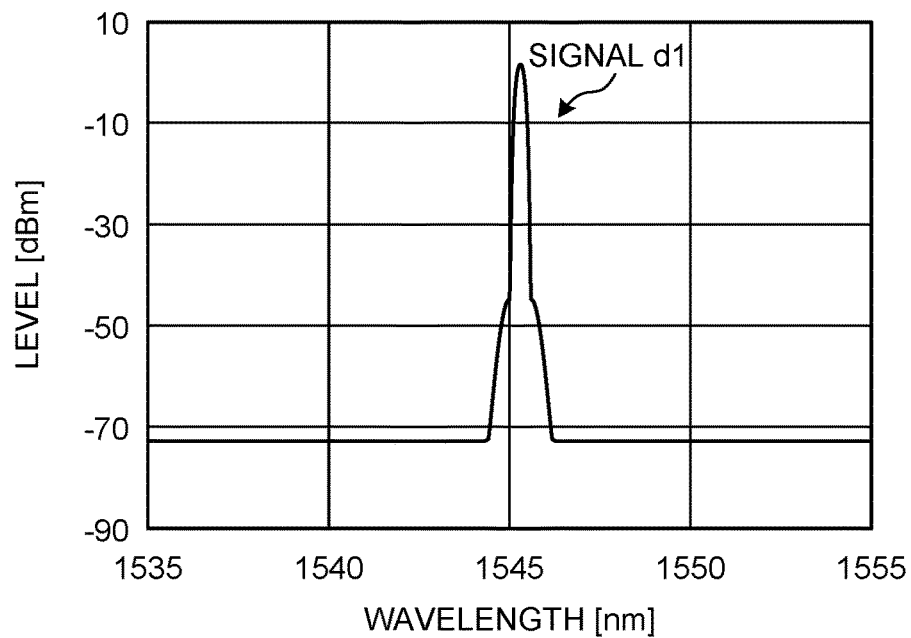
FIG. 17C is an explanatory diagram illustrating an example of transmission light that is an output of the TOF.
Figure 17D:
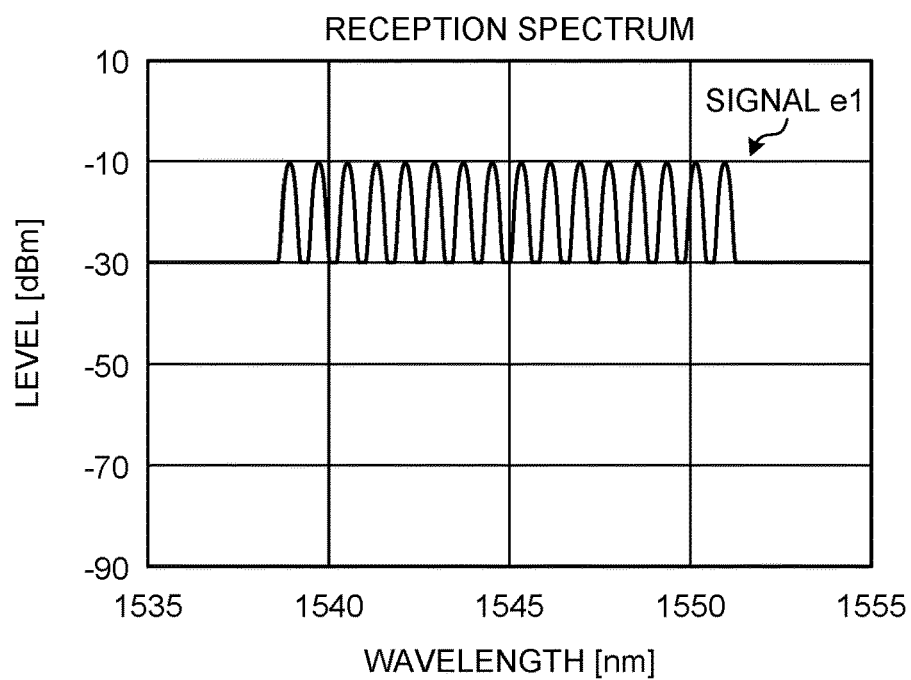
FIG. 17D is an explanatory diagram illustrating an example of multiplexed light that is an input of a receiver.
Figure 18:
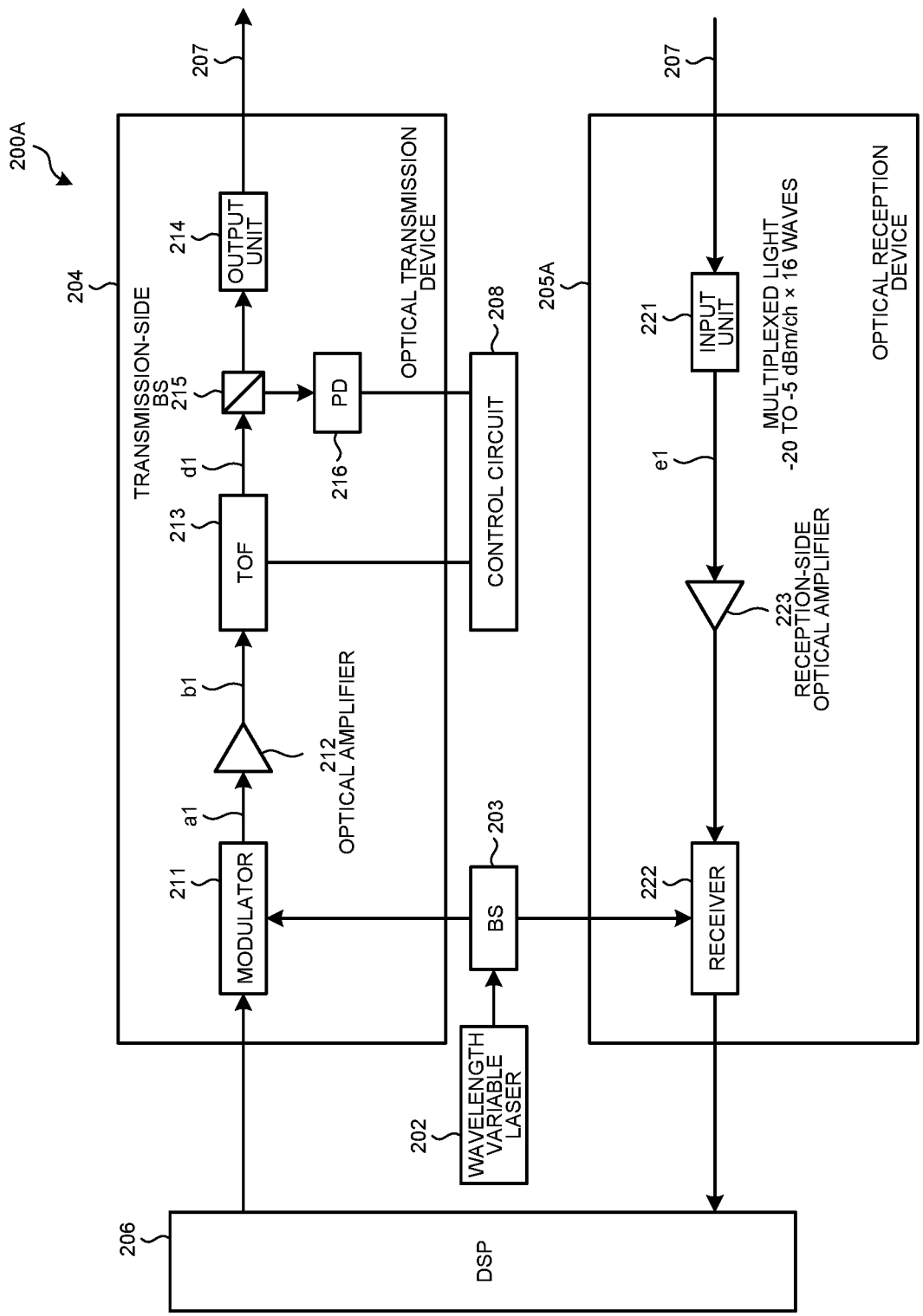
FIG. 18 is an explanatory diagram illustrating an example of the conventional optical coherent transceiver.

The FPGA 28C drives the transmission-side optical amplifier 12 (Step S13). The FPGA 28C sets an initial value of the driving voltage in the second TOF 22 (Step S14). Meanwhile, the FPGA 28C sets the driving voltage by using a table in which the driving voltage and a central wavelength of the second TOF 22 are associated as illustrated in FIG. 16. The FPGA 28C increases the driving voltage of the second TOF 22 (Step S15), and determines whether a level of a peak of receiving target reception light with the same wavelength as the laser light, where the level is monitored by the second PD 27, is increased (Step S16). Meanwhile, the driving voltage of the second TOF 22 is driving voltage for driving the MEMS mirror in the second TOF 22.

If the level of the receiving target reception light is increased (Step S16: Yes), the FPGA 28C proceeds to Step S15 to increase the driving voltage of the second TOF 22.

If the level of the receiving target reception light is not increased (Step S16: No), the FPGA 28C reduces the driving voltage of the second TOF 22 (Step S17). Then, the FPGA 28C determines whether the level of the peak of the receiving target reception light with the same wavelength as the laser light, where the level is monitored by the second PD 27, is increased (Step S18).

If the level of the receiving target reception light is increased (Step S18: Yes), the FPGA 28C proceeds to Step S17 to reduce the driving voltage of the second TOF 22.

If the level of the receiving target reception light is not increased (Step S18: No), the FPGA 28C proceeds to Step S15 to increase the driving voltage of the second TOF 22. In other words, the FPGA 28C repeatedly adjusts the driving voltage of the MEMS mirror of the second TOF 22 until the level of the peak of the reception light with the same wavelength as the transmission light that has transmitted through the second TOF 22 is maximized.

The optical coherent transceiver 1 of the first embodiment optically splits a part of the transmission light travelling from the modulator 11, inputs the part of the transmission light from the second port 22B of the second TOF 22, and detects a level of the part of the transmission light that has transmitted through the second TOF 22 and that is obtained from the first port 22A. Further, the optical coherent transceiver 1 adjusts the passband of the second TOF 22 such that the level of the part of the transmission light is maximized. As a result, only the peak at the wavelength of the reception light is increased in the multiplexed light that has transmitted through the second TOF 22 as illustrated in FIG. 3F, so that the reception-side optical amplifier 23 is able to perform auto level control. Consequently, it is possible to provide the optical coherent transceiver 1 that is able to cope with signal light at a high bit rate, without using an optical amplifier with high output power for performing the constant gain control.

The optical coherent transceiver 1 includes the reception-side optical amplifier 23 that optically amplifies the reception light with the single wavelength coming from the second TOF 22 by using the auto level control, and outputs the optically-amplified reception light to the receiver 24. As a result, the reception-side optical amplifier 23 is able to perform the auto level control of controlling the reception light with the single wavelength, so that it is possible to largely reduce output and power consumption as compared to the conventional reception-side optical amplifier 223.

The optical coherent transceiver 1 includes the first BS 18 that is arranged between the output unit 14 and the modulator 11 and splits a part of the transmission light. Further, the optical coherent transceiver 1 includes the second BS 25 that is arranged between the receiver 24 and the second TOF 22 and inputs the part of the transmission light split by the first BS 18 from the second port 22B of the second TOF 22. Furthermore, the optical coherent transceiver 1 includes the third BS 26 that is arranged between the input unit 21 and the second TOF 22 and outputs the part of the transmission light that has been output from the second TOF 22 to the second PD 27. As a result, it is possible to input the part of the optically-amplified transmission light from the transmission-side optical amplifier 12 to the second TOF 22 through the first BS 18 and the second BS 25.

The first BS 18 is arranged between the transmission-side optical amplifier 12 and the first TOF 13, and therefore provides the transmission light that has been optically amplified by the transmission-side optical amplifier 12 to the optical reception device 5. As a result, it is possible to stably input the part of the transmission light to the second TOF 22 in the optical reception device 5.

Meanwhile, while the example has been described in which the first BS 18 is arranged between the transmission-side optical amplifier 12 and the first TOF 13, the present application is not limited to this example and an appropriate change is applicable.

In the optical transmission device 4 in the optical coherent transceiver 1 of the first embodiment, the reception light may flow into the transmission-side optical amplifier 12 from the second BS 25 through the first BS 18. Therefore, an embodiment that copes with the situation as described above will be described below as a second embodiment.

[b] Second Embodiment

Figure 6:
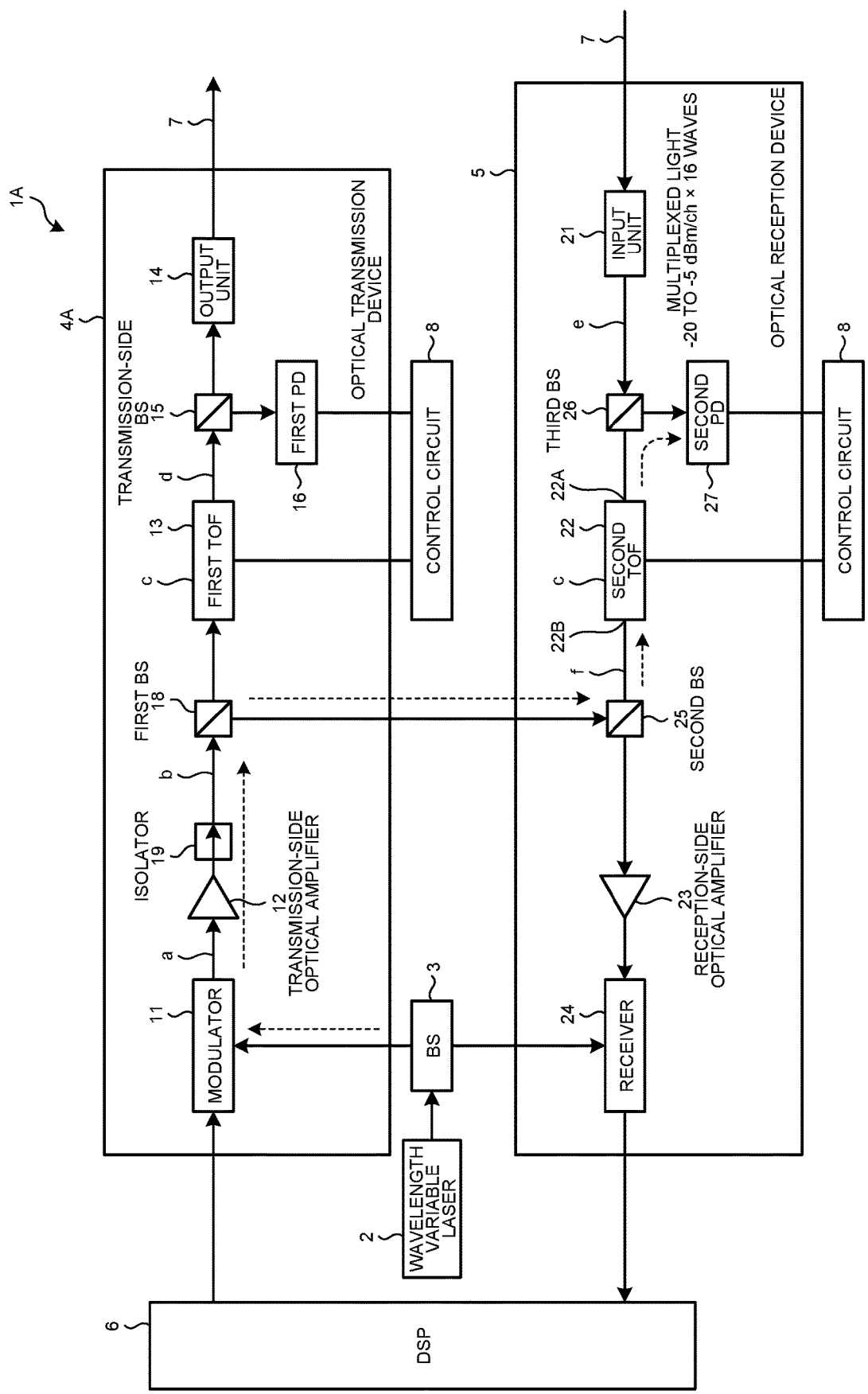
FIG. 6 is an explanatory diagram illustrating an example of an optical coherent transceiver of a second embodiment.

FIG. 6 is an explanatory diagram illustrating an example of an optical coherent transceiver 1A of the second embodiment. Meanwhile, the same components as those of the optical coherent transceiver 1 of the first embodiment are denoted by the same reference symbols, and explanation of the same configuration and operation will be omitted. The optical coherent transceiver 1A illustrated in FIG. 6 is different from the optical coherent transceiver 1 illustrated in FIG. 1 in that an isolator 19 is arranged between the transmission-side optical amplifier 12 and the first BS 18. The isolator 19 prevents the reception light from flowing into the transmission-side optical amplifier 12 from the second BS 25 through the first BS 18.

The optical coherent transceiver 1A of the second embodiment includes the isolator 19 that is arranged between the modulator 11 and the first BS 18 and blocks light travelling from the first BS 18 to the modulator 11. As a result, it is possible to prevent the reception light from flowing into the transmission-side optical amplifier 12 from the second BS 25 through the first BS 18.

Meanwhile, the example has been described in which the isolator 19 is arranged between the modulator 11 and the first BS 18, but an isolator may be arranged between the first BS 18 and the second BS 25 to prevent the reception light from flowing into the first BS 18 from the second BS 25, and an appropriate change is applicable.

Meanwhile, in the optical reception device 5 in the optical coherent transceiver 1 of the first embodiment, in some cases, the transmission light may flow into the input unit 21 from the third BS 26. Therefore, an embodiment that copes with the situation as described above will be described below as a third embodiment.

[c] Third Embodiment

Figure 7:
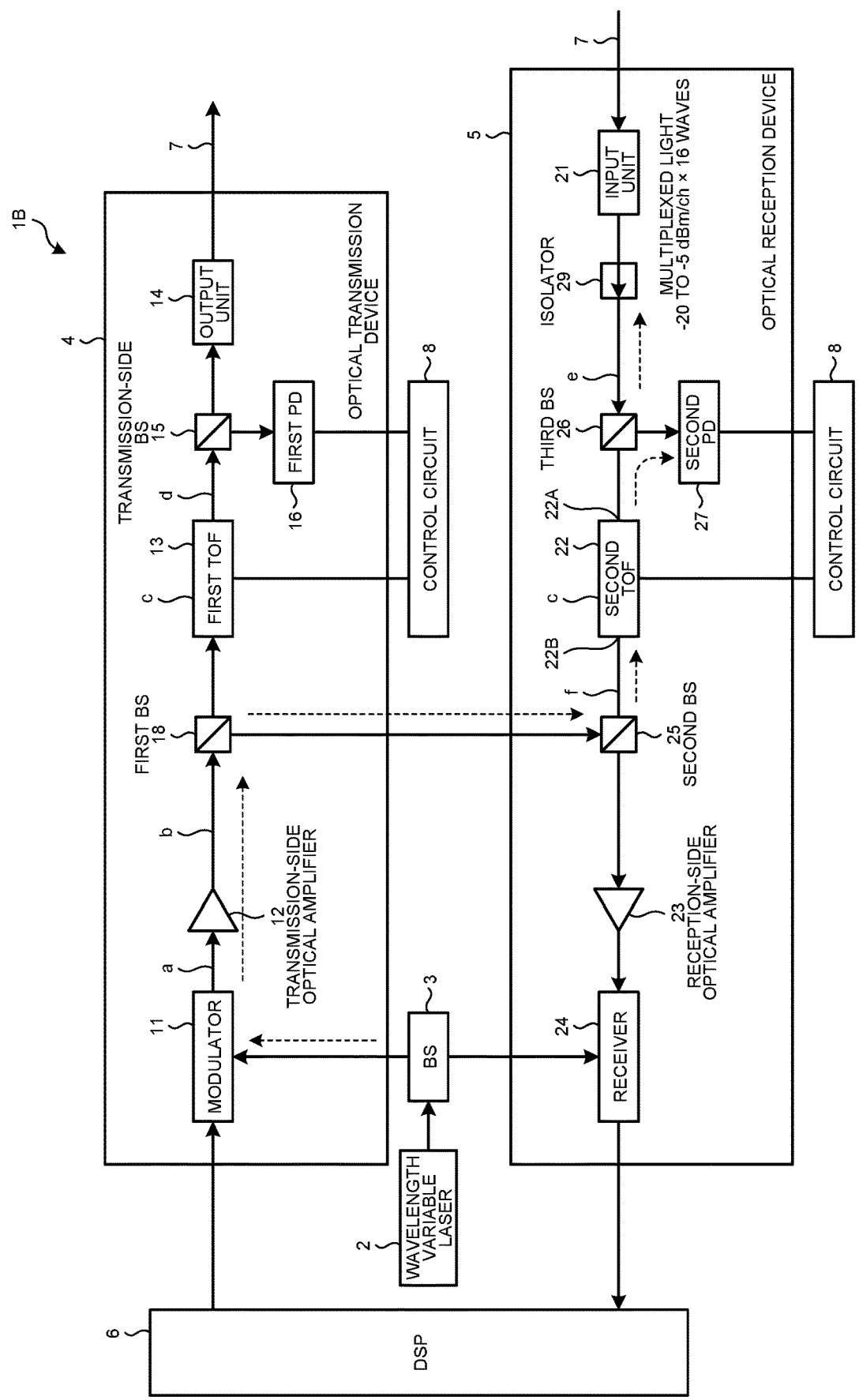
FIG. 7 is an explanatory diagram illustrating an example of an optical coherent transceiver of a third embodiment.

FIG. 7 is an explanatory diagram illustrating an example of an optical coherent transceiver 1B of the third embodiment. Meanwhile, the same components as those of the optical coherent transceiver 1 of the first embodiment are denoted by the same reference symbols, and explanation of the same configuration and operation will be omitted. The optical coherent transceiver 1B illustrated in FIG. 7 is different from the optical coherent transceiver 1 illustrated in FIG. 1 in that an isolator 29 is arranged between the input unit 21 and the third BS 26. The isolator 29 prevents the transmission light from flowing into the input unit 21 from the third BS 26.

The optical coherent transceiver 1B of the third embodiment includes the isolator 29 that is arranged between the input unit 21 and the third BS 26 and that blocks light travelling from the third BS 26 to the input unit 21. As a result, it is possible to prevent the transmission light from flowing into the input unit 21 from the third BS 26.

Meanwhile, in the optical reception device 5 in the optical coherent transceiver 1 of the first embodiment, in some cases, the transmission light may flow into the input unit 21 from the third BS 26. Therefore, an embodiment that copes with the situation as described above will be described below as a fourth embodiment.

[d] Fourth Embodiment

Figure 8:
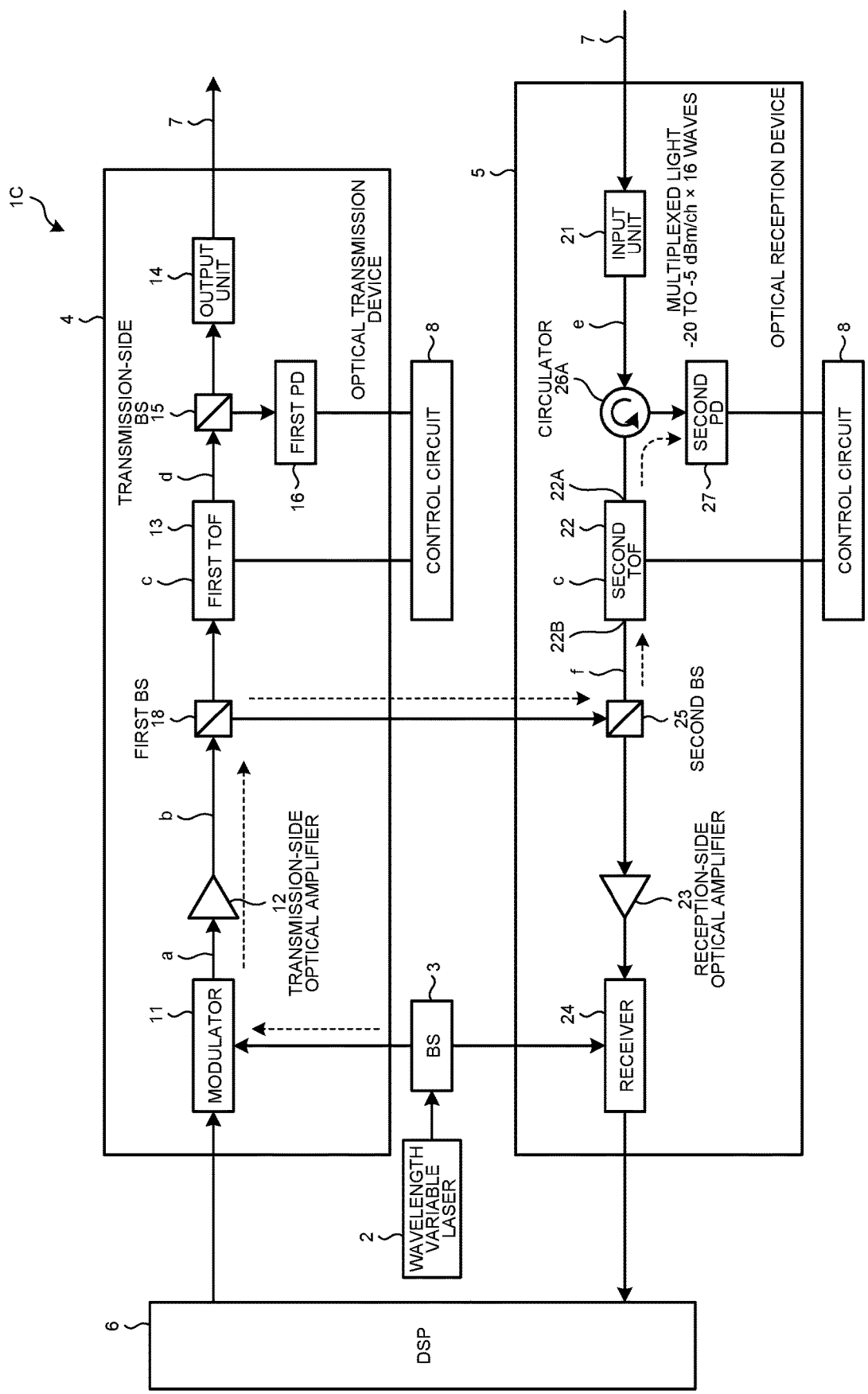
FIG. 8 is an explanatory diagram illustrating an example of an optical coherent transceiver of a fourth embodiment.

FIG. 8 is an explanatory diagram illustrating an example of an optical coherent transceiver 1C of the fourth embodiment. Meanwhile, the same components as those of the optical coherent transceiver 1 of the first embodiment are denoted by the same reference symbols, and explanation of the same configuration and operation will be omitted. The optical coherent transceiver 1C illustrated in FIG. 8 is different from the optical coherent transceiver 1 illustrated in FIG. 1 in that a circulator 26A is arranged instead of the third BS 26. The circulator 26A prevents the transmission light from flowing into the input unit 21 from the second TOF 22, and outputs the transmission light from the second TOF 22 to the second PD 27.

The optical coherent transceiver 1C of the fourth embodiment includes the circulator 26A that outputs, to the second PD 27, a part of the transmission light that is input from the first port 22A of the second TOF 22, and outputs, to the first port 22A of the second TOF 22, the multiplexed light that is input from the input unit 21. As a result, it is possible to prevent the transmission light from flowing into the input unit 21 from the second TOF 22.

Meanwhile, an embodiment in which the optical transmission device 4 and the optical reception device 5 in the optical coherent transceiver 1 of the first embodiment share a TOF will be described below as a fifth embodiment.

[e] Fifth Embodiment

Figure 9:
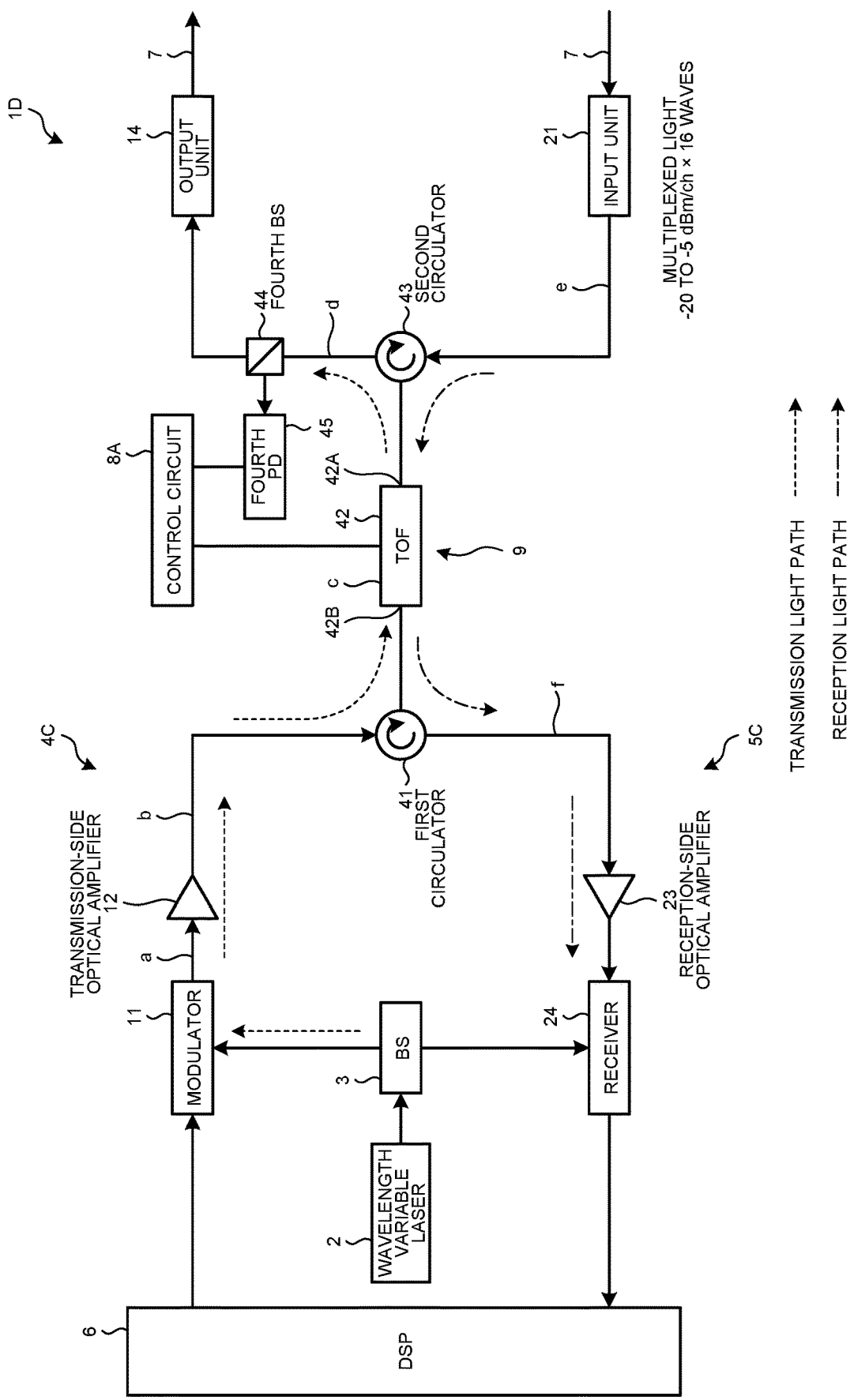
FIG. 9 is an explanatory diagram illustrating an example of an optical coherent transceiver of a fifth embodiment.

FIG. 9 is an explanatory diagram illustrating an example of an optical coherent transceiver 1D of the fifth embodiment. The optical coherent transceiver 1D illustrated in FIG. 9 includes the wavelength variable laser 2, the BS 3, an optical transmission device 4C, an optical reception device 5C, an intermediate unit 9, the DSP 6, and the control circuit 8.

The optical transmission device 4C includes the modulator 11, the transmission-side optical amplifier 12, and the output unit 14. The modulator 11 optically modulates a data signal, which is an electric signal and which is obtained from the DSP 6, on the basis of the laser light travelling from the BS 3 and outputs optically-modulated transmission light to the transmission-side optical amplifier 12. The transmission-side optical amplifier 12 optically amplifies the transmission light travelling from the modulator 11. The output unit 14 is connected to the optical fiber and outputs the transmission light travelling from a TOF 42 in the intermediate unit 9 to the optical fiber.

The optical reception device 5C includes the input unit 21, the reception-side optical amplifier 23, and the receiver 24. The input unit 21 is connected to the optical fiber and inputs multiplexed light travelling from the optical fiber. The reception-side optical amplifier 23 optically amplifies the reception light that has transmitted through the TOF 42 in the intermediate unit 9, and outputs the optically-amplified reception light to the receiver 24. The receiver 24 receives the optically-amplified reception light on the basis of laser light that has been split by the BS 3, converts the received reception light to a data signal that is an electric signal, and outputs the converted data signal to the DSP 6.

The intermediate unit 9 includes a first circulator 41, the TOF 42, a second circulator 43, a fourth BS 44, a fourth PD 45, and a control circuit 8A. The first circulator 41 is arranged between the transmission-side optical amplifier 12 and the TOF 42, and outputs the optically-amplified transmission light from the transmission-side optical amplifier 12 to the TOF 42. Further, the first circulator 41 is arranged between the TOF 42 and the reception-side optical amplifier 23, and outputs the reception light that has transmitted through the TOF 42 to the reception-side optical amplifier 23.

The TOF 42 is a tunable filter that transmits reception light with a specific wavelength from the multiplexed light that is obtained from the input unit 21 through the second circulator 43, and suppresses ASE from the transmission light that is obtained from the modulator 11 through the first circulator 41. The TOF 42 includes a first port 42A and a second port 42B. The first port 42A is a port that is connected to the second circulator 43, inputs the multiplexed light from the second circulator 43, and outputs the transmitted transmission light to the second circulator 43. The second port 42B is a port that is connected to the first circulator 41, inputs the transmission light from the first circulator 41, and outputs the transmitted reception light to the first circulator 41.

The first circulator 41 is arranged between the TOF 42 and the transmission-side optical amplifier 12, and outputs the optically-modulated transmission light from the transmission-side optical amplifier 12 to the second port 42B of the TOF 42. Further, the first circulator 41 is arranged between the TOF 42 and the reception-side optical amplifier 23, and outputs the reception light from the second port 42B of the TOF 42 to the reception-side optical amplifier 23.

The second circulator 43 is arranged between the TOF 42 and the output unit 14, and outputs the transmitted transmission light from the first port 42A of the TOF 42 to the output unit 14. Further, the second circulator 43 is arranged between the input unit 21 and the TOF 42, and outputs the multiplexed light from the input unit 21 to the first port 42A of the TOF 42.

The fourth BS 44 is arranged between the second circulator 43 and the output unit 14, and splits a part of the transmission light travelling from the second circulator 43 toward the fourth PD 45. The fourth PD 45 performs electric conversion on the part of the transmission light that has been split by the fourth BS 44, and detects a level of the transmission light. The control circuit 8A adjusts a passband of the TOF 42 such that the level of the transmission light detected by the fourth PD 45 is maximized.

The TOF 42 of the optical coherent transceiver 1D of the fifth embodiment is arranged on the input stage of the receiver 24 and on the output stage of the modulator 11, and includes the first port 42A for inputting the multiplexed light and the second port 42B for outputting the transmitted reception light. As a result, the optical transmission device 4C and the optical reception device 5C are able to share the single TOF 42. Further, with use of the single TOF 42, it is possible to reduce the number of components, such as the BS and the PD, that are used for feedback control.

Furthermore, the optical coherent transceiver 1D includes the first circulator 41 that inputs the transmission light travelling form the modulator 11 to the second port 42B of the TOF 42, and outputs the reception light travelling from the second port 42B to the receiver 24. The optical coherent transceiver 1D includes the second circulator 43 that outputs the transmission light travelling from the first port 42A to the output unit 14 and outputs the multiplexed light travelling from the input unit 21 to the first port 42A. The optical coherent transceiver 1D detects a part of the transmission light travelling from the second circulator 43 to the output unit 14, and adjusts the passband of the TOF 42 such that the level of the part of the transmission light is maximized. As a result, only the peak at the wavelength of the reception light is increased in the multiplexed light that has transmitted through the TOF 42 as illustrated in FIG. 3F, so that the reception-side optical amplifier 23 is able to perform auto level control. Consequently, it is possible to provide the optical coherent transceiver 1D that is able to cope with signal light at a high bit rate, without using an optical amplifier with high output power for performing the constant gain control.

The optical coherent transceiver 1D includes the reception-side optical amplifier 23 that optically amplifies the transmitted reception light with the single wavelength coming from the TOF 42 by using the auto level control, and outputs the optically-amplified reception light to the receiver 24. As a result, the reception-side optical amplifier 23 is able to perform the auto level control of controlling the reception light with the single wavelength, so that it is possible to largely reduce output and power consumption as compared to the conventional reception-side optical amplifier 223.

The components of each of the units illustrated in the drawings do not necessarily have to be physically configured in the manner illustrated in the drawings. In other words, specific forms of distribution and integration of the units are not limited to those illustrated in the drawings, and all or part of the units may be functionally or physically distributed or integrated in arbitrary units depending on various loads or use conditions.

All or any part of various processing functions performed by each of the devices may be implemented by a central processing unit (CPU) (or a microcomputer, such as a micro processing unit (MPU), a micro controller unit (MCU), or an FPGA). Further, all or any part of the various processing functions may be implemented by a program that is analyzed and executed by the CPU (or a microcomputer, such as an MPU or an MCU) or may be implemented as hardware using wired logic.

According to one aspect of the present application, it is possible to provide an optical coherent transceiver that is able to cope with signal light at a high bit rate.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An optical coherent transceiver comprising:
   a modulator that optically modulates a data signal on the basis of laser light and outputs transmission light;
   a receiver that inputs a multiplexed light and receives reception light with same wavelength as the transmission light from the multiplexed light, on the basis of the laser light;

a tunable filter that is arranged on an input stage of the receiver and includes
a first port that inputs the multiplexed light;
a filter body that transmits the reception light from the multiplexed light; and;
a second port that outputs the reception light that has transmitted through the filter body;
a first splitter that optically splits a part of the transmission light travelling from the modulator;
a second splitter that is arranged between the receiver and the tunable filter and inputs the part of the transmission light that has been split by the first splitter to the second port of the tunable filter;
a detector that detects a level of the part of the transmission light input to the second port of the tunable filter; and
a control circuit that adjusts a passband of the tunable filter on the basis of the level of the part of the transmission light detected by the detector.

2. The optical coherent transceiver according to claim 1 further comprising:
an optical amplifier that is arranged on an input stage of the receiver, optically amplifies the reception light that has transmitted through the tunable filter, and outputs the optically-amplified reception light to the receiver.

3. The optical coherent transceiver according to claim 1, further comprising:
an output port that outputs the transmission light travelling from the modulator to an optical fiber;
an input port that inputs the multiplexed light travelling from the optical fiber;
the first splitter that is arranged between the output port and the modulator and splits the part of the transmission light;
a third splitter that is arranged between the input port and the tunable filter and outputs the part of the transmission light that has been output from the first port of the tunable filter to the detector.

4. The optical coherent transceiver according to claim 3, further comprising:
an isolator that is arranged between the modulator and the first splitter and blocks light travelling from the first splitter to the modulator.

5. The optical coherent transceiver according to claim 3, further comprising:
an isolator that is arranged between the input port and the third splitter and blocks light traveling from the third splitter to the input port.

6. The optical coherent transceiver according to claim 3, wherein the third splitter is a circulator that outputs the part of the transmission light that has been output from the first port of the tunable filter to the detector, and inputs the multiplexed light that has been input from the input port to the first port of the tunable filter.

7. An optical coherent transceiver comprising:
a modulator that optically modulates a data signal on the basis of laser light and outputs transmission light;
a receiver that inputs a multiplexed light and receives reception light with same wavelength as the transmission light from the multiplexed light, on the basis of the laser light;
a tunable filter that is arranged on an input stage of the receiver and on an output stage of the modulator and includes
a first port that inputs the multiplexed light;
a filter body that transmits the reception light from the multiplexed light; and
a second port that outputs the reception light that has transmitted through the filter body;
an output port that outputs the transmission light travelling from the modulator to an optical fiber;
an input port that inputs the multiplexed light travelling from the optical fiber;
a first circulator that inputs the transmission light travelling from the modulator to the second port of the tunable filter, and outputs the reception light travelling from the second port of the tunable filter to the receiver;
a second circulator that outputs the transmission light travelling from the first port of the tunable filter to the output port, and outputs the multiplexed light travelling from the input port to the first port of the tunable filter;
a detector that detects a level of a part of the transmission light travelling from the second circulator to the output port; and
a control circuit that adjusts a passband of the tunable filter on the basis of the level of the part of the transmission light detected by the detector.

8. A filter adjustment method implemented by an optical coherent transceiver including
a modulator that optically modulates a data signal on the basis of laser light and outputs transmission light;
a receiver that inputs a multiplexed light and receives reception light with same wavelength as the transmission light from the multiplexed light, on the basis of the laser light; and and
a tunable filter that is arranged on an input stage of the receiver and includes
a first port that inputs the multiplexed light;
a filter body that transmits the reception light from the multiplexed light; and
a second port that outputs the reception light that has transmitted through the filter body,
the filter adjustment method comprising:
optically splitting a part of the transmission light travelling from the modulator;
inputting the part of the transmission light to the second port of the tunable filter;
detecting a level of the part of the transmission light input from the second port of the tunable filter; and
adjusting a passband of the tunable filter on the basis of the level of the part of the transmission light.

* * * * *